US007250485B2

(12) United States Patent
Ito et al.

(10) Patent No.: US 7,250,485 B2
(45) Date of Patent: Jul. 31, 2007

(54) POLYESTER RESIN COMPOSITION FOR TONER AND TONER

(75) Inventors: Hirokazu Ito, Toyohashi (JP); Masaru Sugiura, Toyohashi (JP); Yoko Tamura, Toyohashi (JP); Akifumi Kondou, Toyohashi (JP); Shinya Yamato, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/539,798

(22) PCT Filed: Dec. 17, 2003

(86) PCT No.: PCT/JP03/16179

§ 371 (c)(1),
(2), (4) Date: Aug. 11, 2005

(87) PCT Pub. No.: WO2004/057419

PCT Pub. Date: Jul. 8, 2004

(65) Prior Publication Data

US 2006/0078815 A1 Apr. 13, 2006

(30) Foreign Application Priority Data

| | | |
|---|---|---|
| Dec. 20, 2002 | (JP) | 2002-370103 |
| Dec. 20, 2002 | (JP) | 2002-370447 |
| Jan. 22, 2003 | (JP) | 2003-013794 |
| Jan. 31, 2003 | (JP) | 2003-024500 |
| Feb. 4, 2003 | (JP) | 2003-027186 |
| Mar. 13, 2003 | (JP) | 2003-068375 |
| Jul. 15, 2003 | (JP) | 2003-274842 |

(51) Int. Cl.
*C08G 63/16* (2006.01)
*C08G 63/66* (2006.01)

(52) U.S. Cl. ...................... 528/300; 528/302; 528/307; 528/308; 525/437; 525/444; 430/109; 430/110

(58) Field of Classification Search ................ 528/300, 528/302, 307, 308; 525/437, 444, 44; 430/109, 430/110
See application file for complete search history.

(56) References Cited

U.S. PATENT DOCUMENTS

| | | | |
|---|---|---|---|
| 4,980,448 | A | 12/1990 | Tajiri et al. |
| 5,057,596 | A | 10/1991 | Kubo et al. |
| 5,153,301 | A | 10/1992 | Tajiri et al. |
| 5,270,436 | A | 12/1993 | Kubo et al. |
| 5,276,127 | A | 1/1994 | Takyu et al. |
| 5,409,989 | A | 4/1995 | Ito et al. |
| 6,007,958 | A | 12/1999 | Ito et al. |
| 6,040,104 | A | 3/2000 | Nakamura et al. |
| 2004/0152005 | A1 | 8/2004 | Ito et al. |

FOREIGN PATENT DOCUMENTS

| | | |
|---|---|---|
| JP | 08-030027 | 2/1996 |
| JP | 9-138602 | 5/1997 |
| JP | 10-10777 | 1/1998 |
| JP | 11-194542 | 7/1999 |
| JP | 11-305485 | 11/1999 |
| JP | 2000-66447 | 3/2000 |
| JP | 2001-222138 | 8/2001 |
| JP | 2001-249492 | 9/2001 |
| JP | 2001-330994 | 11/2001 |
| JP | 2002-072548 | 3/2002 |
| JP | 2002-072549 | 3/2002 |
| JP | 2002-236393 | 8/2002 |
| JP | 2002-341595 | 11/2002 |
| JP | 2003-066653 | 3/2003 |

*Primary Examiner*—Duc Truong
(74) *Attorney, Agent, or Firm*—Oblon, Spivak, McClelland, Maier & Neustadt, P.C.

(57) ABSTRACT

A toner resin composition comprising a linear polyester resin (A) containing a $C_3$ to $C_{10}$ aliphatic diol component and a linear polyester resin (B) containing a $C_3$ to $C_{10}$ aliphatic diol component which differs from the linear polyester resin (A), or further comprising a vinyl-based resin (C), and a toner containing the toner resin composition as a binding resin. A toner excellent in low temperature fixability, offset resistance, gloss, etc. and excellent in range of fixing temperature can be obtained.

22 Claims, No Drawings

POLYESTER RESIN COMPOSITION FOR TONER AND TONER

TECHNICAL FIELD

The present invention relates to a toner polyester resin and resin composition and to a toner containing these as a binding resin. In particular, the present invention provides a toner used in development of an electrostatic image or magnetic latent image in electrophotography, electrostatic printing, etc. and excellent in low temperature fixability, offset resistance, gloss, etc.

BACKGROUND ART

In the method of using electrophotography printing and electrostatic development to obtain an image, the electrostatic image formed on a photosensitive body is developed by a toner given a charge by rubbing in advance, then is fixed. The fixing methods include the heat roller system of fixing the toner image obtained by development by a pressing and heat roller and the noncontact fixing system of fixing the image using an electric oven or flash beam of light. To get through these processes without problem, the toner first of all has to have a stable electrostatic charge. Next, the fixability to paper must be good. Further, since the apparatus has a fixing unit which is a heater and the temperature inside the apparatus rises, the toner must not form blocks. Recently, energy saving has become essential and the fixing unit in the heat roller system has been made lower in temperature. Therefore, there are strong calls for the toner to feature the ability to fix images to paper at lower temperatures, that is, a low temperature fixability. Further, recently, along with the spread of full color electrophotography systems, a toner enabling the formation of a glossy image has been sought.

The toner binding resin has a large effect on such toner characteristics. A polystyrene resin, styrene-acryl resin, polyester resin, epoxy resin, polyamide resin, etc. are known. Recently, however, due to the ease of obtaining a good balance of transparency and fixability, the excellent transparency, and the properties suitable for a full color toner, polyester resins have been looked at with particular interest.

However, to obtain a good fixability for a toner using a polyester-based resin as a binding resin, as described in Japanese Unexamined Patent Publication (Kokai) No. 4-12367 and Japanese Unexamined Patent Publication (Kokai) No. 59-128558, improvement of the fixability by a monomer has been proposed, but the obtained resin has the problems of a high molecular weight and the inability to obtain the targeted fixability.

Further, as shown in Japanese Unexamined Patent Publication (Kokai) No. 7-140714, Japanese Unexamined Patent Publication (Kokai) No. 2002-287427, Japanese Unexamined Patent Publication (Kokai) No. 2002-202634, and Japanese Unexamined Patent Publication (Kokai) No. 4-313760, it has been proposed to blend polyester resins with different softening temperatures and molecular weights, but with this method, adjustment of the balance between the fixability and the offset resistance is difficult. Further, there is the problem of the difficulty in adjusting the balance with the gloss between the polymer component or bisphenol A derivative component or unsaturated fatty acid or other monomer component.

Further, in Japanese Unexamined Patent Publication (Kokai) No. 4-362956, Japanese Unexamined Patent Publication (Kokai) No. 8-320593, attempts are made to mix into a nonlinear polyester a low melting point linear polyester to improve the low temperature fixability. Further, Japanese Unexamined Patent Publication (Kokai) No. 10-339969, Japanese Unexamined Patent Publication (Kokai) No. 2000-305316, etc. study use of linear polyesters.

Further, Japanese Unexamined Patent Publication (Kokai) No. 8-30027 proposes a resin given a good low temperature fixability, but this has the problem of an insufficient balance with the grindability and insufficient durability for long term printing resistance.

Thanks to these technologies etc., toner resins improved in fixing performance have been developed, but the market demands on fixing performance have become further severe. The above-mentioned technology did not go so far as to develop a resin maintaining the blocking resistance, offset resistance, and other required properties and yet having low temperature fixability and gloss able to satisfy market demands.

Further, recently, energy saving has become essential. In the heat roller system, the fixing units have been made lower in temperature. Therefore, performance enabling images to be fixed to paper at lower temperatures, that is, low temperature fixability, is now being strongly sought from toners. Further, a broader working range is being required. Therefore, there have been demands for a greater range of fixing temperature of toners.

For example, Japanese Unexamined Patent Publication (Kokai) No. 4-362956 studies a binding resin making use of both a nonlinear polyester and a linear polyester. Specifically, it discloses a toner having a range of fixing temperature of 50° C. or more making use of both a nonlinear polyester having a softening temperature of 110 to 116° C. and a linear polyester having a softening point of 85 to 102° C. However, the toner described in Japanese Unexamined Patent Publication (Kokai) No. 4-362956 has a wide range of fixing temperature, but a high minimum fixing temperature of 150° C. or more and therefore still an insufficient low temperature fixability.

Japanese Unexamined Patent Publication (Kokai) No. 4-313760 studies a binding resin using two types of linear polyester with different softening points. Specifically, it discloses a toner having a range of fixing temperature of 30° C. or more using a high softening point linear polyester with a softening point of 112 to 123° C. and a low softening point linear polyester with a softening point of 89 to 92° C. However, the toner described in Japanese Unexamined Patent Publication (Kokai) No. 4-313760 has a minimum fixing temperature of a high 150° C. or more and is still insufficient in low temperature fixability.

Therefore, in view of the recently increased speeds, smaller sizes, and greater energy savings of copiers, a further lower temperature fixability and wider range of fixing temperature are desired.

DISCLOSURE OF THE INVENTION

Therefore, an object of the present invention is to solve the above problems in the prior art and provide a toner polyester resin and resin composition able to give a toner excellent in low temperature fixability, offset resistance, gloss, etc. and excellent in range of fixing temperature and a toner using the same.

That is, the first aspect of the present invention provides a toner resin composition comprising a linear polyester resin (A) containing a $C_3$ to $C_{10}$ aliphatic diol component and a linear polyester resin (B) containing a $C_3$ to $C_{10}$ aliphatic diol component which differs from said linear polyester resin (A), the (parts by mole of the $C_3$ to $C_{10}$ aliphatic diol component in the linear polyester resin (B))/(parts by mole of the $C_3$ to $C_{10}$ aliphatic diol component in the linear polyester resin (A)) in the case of designating the total acid component of the resin as 100 parts by mole being in a range of 0.5 to 10.

Further, a second aspect of the invention provides a toner resin composition comprising a linear polyester resin (A) containing a $C_3$ to $C_{10}$ aliphatic diol component, a linear polyester resin (B) containing a $C_3$ to $C_{10}$ aliphatic diol component which differs from said linear polyester resin (A), and a vinyl-based resin (C), the (parts by mole of the $C_3$ to $C_{10}$ aliphatic diol component in the linear polyester resin (B))/(parts by mole of the $C_3$ to $C_{10}$ aliphatic diol component in the linear polyester resin (A)) in the case of designating the total acid component of the resin as 100 parts by mole being in a range of 0.5 to 10.

Further, a third aspect of the invention provides a toner linear polyester resin (a1) comprising a $C_3$ to $C_{10}$ aliphatic diol component in an amount of 10 to 60 parts by mole with respect to 100 parts by mole of the total carboxylic acid component, having a glass transition temperature in a range of 50 to 75° C., having a mass average molecular weight Mw in a range of 25,000 to 100,000, not having a melting point, having a softening temperature in a range of 150 to 220° C., and having an acid value of 10 mgKOH/g or less and a toner containing said toner linear polyester resin (a1) as a binding resin.

Further, a fourth aspect of the invention provides a toner linear polyester resin (b1) comprised of a linear polyester resin comprised of a dicarboxylic acid component and a diol component, comprising an aromatic dicarboxylic acid in a total carboxylic acid component in an amount of 50 mol % or more, containing a $C_4$ to $C_8$ aliphatic diol in an amount of 60 parts by mole or more with respect to 100 parts by mole of the total carboxylic acid component, having a glass transition temperature in a range of 40 to 70° C., having a mass average molecular weight Mw in a range of 4,000 to 10,000, not having a melting point, and having a softening temperature in a range of 90 to 120° C. and a toner containing said toner linear polyester resin (b1) as a binding resin.

Further, a fifth aspect of the invention provides a toner comprising a binding resin and a coloring agent, wherein the binding resin is mainly comprised of a polyester resin, the polyester resin contains a polyester resin (X) and a polyester resin (Y), a blending ratio of the polyester resin (X) and polyester resin (Y) is 5/95 to 95/5 (mass ratio), the polyester resin (X) is a linear polyester resin with a mass average molecular weight Mw of 25,000 to 100,000 and a softening temperature of 150 to 220° C., the polyester resin (Y) is a linear polyester resin with a mass average molecular weight Mw of 2,000 to 10,000, and a minimum fixing temperature is 130° C. or less and a range of fixing temperature is 40° C. or more, and a binding resin used in said toner.

According to the present invention, it is possible to obtain a toner polyester resin and resin composition able to give a toner excellent in low temperature fixability, offset resistance, gloss, etc. and further excellent in range of fixing temperature and possible to use this toner resin composition to obtain a toner excellent in low temperature fixability, offset resistance, gloss, etc. and excellent in range of fixing temperature.

BEST MODE FOR WORKING THE INVENTION

First, the first to fourth aspects of the present invention will be explained.

The linear polyester resin (A) and linear polyester resin (B) used in the first to fourth aspects of the present invention contain a $C_3$ to $C_{10}$ aliphatic diol component as an essential component.

By containing this component, it is possible to obtain a toner with an excellent fixability to paper. The $C_3$ to $C_{10}$ aliphatic diol component may be suitably selected in accordance with need, but in particular at least one type of component selected from neopentyl glycol, propylene glycol, and cyclohexane dimethanol is preferable. These components may be used alone or in combinations of two or more types.

The contents of the $C_3$ to $C_{10}$ aliphatic diol components in the linear polyester resin (A) and the linear polyester resin (B) have to be ones where, when the total acid component in each resin is 100 parts by mole, the (parts by mole of the $C_3$ to $C_{10}$ aliphatic diol component in the linear polyester resin (B))/(parts by mole of the $C_3$ to $C_{10}$ aliphatic diol component in the linear polyester resin (A)) is in a range of 0.5 to 10. This is because if the value is less than 0.5, the offset resistance of the toner becomes poor as a general tendency. Preferably, it is 0.9 or more, more preferably 1 or more. Further, even when over 10, the offset resistance of the toner becomes poor as a general tendency. Preferably, it is 7 or less, more preferably 6 or less.

The linear polyester resin (A), when the total acid component is 100 parts by mole, preferably contains the $C_3$ to $C_{10}$ aliphatic diol component in an amount of 10 to 60 parts by mole. This is because by making this component 10 parts by mole or more, the fixability of the toner becomes good as a general tendency. More preferably, it is 15 parts by mole or more. Further, by making it 60 parts by mole or less, the offset resistance of the toner becomes good as a general tendency. More preferably, it is 55 parts by mole or less.

The linear polyester resin (B), when the total acid component is 100 parts by mole, preferably contains the $C_3$ to $C_{10}$ aliphatic diol component in an amount of 55 to 100 parts by mole. This is because by making this component 55 parts by mole or more, the fixability of the toner becomes good as a general tendency. More preferably, it is 60 parts by mole or more. Further, by making it 100 parts by mole or less, the offset resistance of the toner becomes good as a general tendency. More preferably, it is 95 parts by mole or less.

As other diol components useful as components of the linear polyester resin (A) or linear polyester resin (B), for example, polyoxyethylene-(2.0)-2,2-bis(4-hydroxyphenyl) propane, polyoxypropylene-(2.0)-2,2-bis(4-hydroxyphenyl) propane, polyoxypropylene(2.2)-polyoxyethylene-(2.0)-2, 2-bis(4-hydroxyphenyl)propane, polyoxypropylene(6)-2,2-bis(4-hydroxyphenyl)propane, polyoxypropylene(2.2)-2,2-bis(4-hydroxyphenyl)propane, polyoxypropylene-(2.4)-2,2-bis(4-hydroxyphenyl)propane, polyoxypropylene(3.3)-2,2-bis(4-hydroxyphenyl)propane, and other aromatic diol components may be mentioned. These may be used alone or in mixtures of two or more types. An aromatic diol component has the effect of raising the glass transition temperature of the resin, so if using this as a component, the obtained blocking resistance of the toner is improved as a general tendency. In particular, a polyoxypropylene(n)-2,2-bis(4-hydroxyphenyl)propane where the number n of the polyoxypropylene units or polyoxyethylene units is $2.1 \leqq n \leqq 8$ and/or a polyoxyethylene (n)-2,2-bis(4-hydroxyphenyl)propane where $2.0<n<3.0$ is preferable.

On the other hand, these aromatic diol components may have a detrimental effect on the gloss of the obtained toner, so the amount used is preferably made, when the total acid component is designated as 100 parts by mole, 10 parts by mole or less in the case of the linear polyester resin (A) and 50 parts by mole or less in the case of the linear polyester resin (B). Further, as examples of other useful diol components, for example, ethylene glycol, hydrated bisphenol A, etc. may be mentioned. These may be used alone or in mixtures of two or more types.

As a dicarboxylic acid component useful as a component of the linear polyester resin (A) or linear polyester resin (B), for example, a component from terephthalic acid, isophthalic acid, or their lower alkyl esters etc. may be mentioned. As specific examples of the lower alkyl esters of terephthalic acid or isophthalic acid, dimethyl terephthalate, dimethyl isophthalate, diethyl terephthalate, diethyl isophthalate, dibutyl terephthalate, dibutyl isophthalate. etc. may be mentioned, but in terms of handling and cost, terephthalic acid or isophthalic acid is preferable. These dicarboxylic acids or their lower alkyl esters may be used alone or in mixtures of two or more types.

As other useful dicarboxylic acid components, for example, components from phthalic acid, sebacic acid, indecyl succinic acid, dodecenyl succinic acid, maleic acid, fumaric acid, adipic acid, or their monomethyl, monoethyl, dimethyl, diethyl esters or their acid anhydrides may be mentioned. These dicarboxylic acid components are related to the basic properties of the fixability and blocking resistance of the toner, so may be suitably used in accordance with the required performance in a range not detracting from the object of the present invention.

The linear polyester resin (A) is preferably one having a softening temperature in the range of 150 to 220° C. This is because by making the softening temperature 150° C. or more, the offset resistance of the toner becomes good as a general tendency. Preferably, it is 160° C. or more, more preferably 170° C. or more. Further, by making the softening temperature 220° C. or less, the fixability of the toner becomes good as a general tendency. Preferably it is 210° C. or less, more preferably 200° C. or less.

Further, the linear polyester resin (A) is preferably one having a glass transition temperature (hereinafter referred to as "Tg") in a range of 50 to 75° C. By making Tg 50° C. or more, the blocking resistance of the toner becomes good as a general tendency. More preferably, it is 52° C. or more. On the other hand, by making Tg 75° C. or less, the fixability of the toner becomes good as a general tendency. More preferably, it is 73° C. or less.

Further, the linear polyester resin (A) is preferably one having a mass average molecular weight Mw in a range of 25,000 to 100,000. By making the mass average molecular weight Mw 25,000 or more, the offset resistance of the toner becomes good as a general tendency. More preferably, it is 29,000 or more. By making the mass average molecular weight Mw 100,000 or less, the fixability of the toner becomes good as a general tendency. More preferably, it is 90,000 or less.

Further, the linear polyester resin (A) is preferably one not having a melting point. By having the linear polyester resin (A) not have a melting point, the fixability or gloss of the toner is improved as a general tendency.

Further, the acid value of the linear polyester resin (A) is preferably 10 mgKOH/g or less. Due to this, the image density of the toner becomes resistant to any decline as a general tendency.

In particular, a linear polyester resin (a) containing a $C_3$ to $C_{10}$ aliphatic diol component in an amount of 10 to 60 parts by mole, having a glass transition temperature of 50 to 75° C., having a mass average molecular weight Mw of 25,000 to 100,000, and not having a melting point is preferable.

Further, a toner use linear polyester resin (a1) containing a $C_3$ to $C_{10}$ aliphatic diol component in an amount of 10 to 60 parts by mole, having a glass transition temperature in the range of 50 to 75° C., having a mass average molecular weight Mw in the range of 25,000 to 100,000, not having a melting point, having a softening temperature in the range of 150 to 220° C., and having an acid value of 10 mgKOH/g or less is most preferable.

By using the linear polyester resin (a1), it is possible to obtain a resin able to provide a toner with a smooth fixing surface and good fixability.

The $C_3$ to $C_{10}$ aliphatic diol in the linear polyester resin (a1) is not particularly limited, but preferably is at least one selected from neopentyl glycol, propylene glycol, and cyclohexane dimethanol.

The softening temperature of the linear polyester resin (a1) is preferably at least 160° C. from the viewpoint of the offset resistance. Further, the softening temperature of the linear polyester resin (a1) is more preferably not more than 210° C. from the viewpoint of the fixability, more preferably not more than 200° C.

The glass transition temperature of the linear polyester resin (a1) is preferably at least 52° C. from the viewpoint of the blocking resistance and preferably not more than 73° C. from the viewpoint of the fixability.

Further, the mass average molecular weight Mw of the linear polyester resin (a1) is more preferably at least 29,000 from the viewpoint of offset resistance, more preferably not more than 90,000 from the viewpoint of fixability.

Further, the acid value of the linear polyester resin (a1) is particularly preferably not more than 8 mgKOH/g from the viewpoint of the image density stability.

The linear polyester resin (B) is preferably one having a softening temperature in the range of 70 to 110° C. By making the softening temperature 70° C. or more, the offset resistance of the toner becomes good as a general tendency. More preferably, it is 80° C. or more, more preferably 90° C. or more. By making the softening temperature 110° C. or less, the fixability of the toner becomes good as a general tendency. More preferably, it is 108° C. or less, more preferably 105° C. or less.

Further, the linear polyester resin (B) is preferably one having a mass average molecular weight Mw in the range of 2,000 to 10,000. By making the mass average molecular weight Mw 2,000 or more, the offset resistance of the toner becomes good as a general tendency. More preferably, it is 3,000 or more. By making the mass average molecular weight Mw 10,000 or less, the fixability of the toner becomes good as a general tendency.

Further, the linear polyester resin (B) is preferably one not having a melting point. By having the linear polyester resin (B) not have a melting point, the fixability and gloss of the toner are improved as a general tendency.

The linear polyester resin (B) is preferably one having a Tg in the range of 40 to 70° C. By making Tg 40° C. or more, the blocking resistance of the toner becomes good as a general tendency. More preferably, it is 45° C. or more. On the other hand, by making Tg 70° C. or less, the fixability of the toner becomes good as a general tendency. More preferably, it is 67° C. or less.

Further, the acid value of the linear polyester resin (B) is preferably 30 mgKOH/g or less. Due to this, the image density of the toner becomes resistant to any decline as a general tendency. More preferably, it is 20 mgKOH/g or less. In particular, to raise the dispersion of the charge controlling agent (charge controlling resin) in the toner and make the stability of the image density good, it is preferable to make the acid value of the linear polyester resin (B) higher than the acid value of the linear polyester resin (A).

In particular, the linear polyester (B) is preferably a linear polyester resin (b) containing a $C_3$ to $C_{10}$ aliphatic diol component in an amount of 55 to 100 parts by mole, having a glass transition temperature of 40 to 70° C., having a mass average molecular weight Mw of 2,000 to 10,000, and not having a melting point.

Further, the linear polyester resin (B) is most preferably a linear polyester resin (b1) comprised of a dicarboxylic acid component and diol component, containing the aromatic dicarboxylic acid component in an amount of 50 mol % or more in the total carboxylic acid component and a $C_4$ to $C_8$ aliphatic diol in an amount of 60 parts by mole or more with respect to 100 parts by mole of the total carboxylic acid component, having a glass transition temperature in the range of 40 to 70° C., having a mass average molecular weight Mw in the range of 4,000 to 10,000, not having a melting point, and having a softening temperature in the range of 90 to 120° C. In this case, the low temperature fixability becomes the best. In the case of this linear polyester resin (b1), the resin can be used alone. The object of the present invention can be realized even without using another linear polyester resin (A) as a general tendency.

In this case, as the aromatic dicarboxylic acid component, components from terephthalic acid, isophthalic acid, or their lower alkyl esters etc. may be mentioned. These components may be used alone or in combinations of two or more types.

In the linear polyester resin (b1), as the dicarboxylic acid component, the aromatic dicarboxylic acid is used in an amount of at least 50 mol % in the total carboxylic acid component, preferably at least 90 mol %, more preferably at least 95 mol %. This is because by making the aromatic dicarboxylic acid component at least 50 mol %, the balance of the fixability, blocking resistance, and other physical properties of the obtained resin becomes good as a general tendency.

Further, as the diol forming the $C_4$ to $C_8$ aliphatic diol component, neopentyl glycol, 1,2-butanediol, 1,3-butanediol, 1,4-butanediol, 2,3-butanediol, diethylene glycol, triethylene glycol, 1,5-pentanediol, etc. may be mentioned. Among these, neopentyl glycol is particularly preferred since it gives a resin having a high affinity with paper and excellent in low temperature fixability.

The diol component used in the linear polyester resin (b1) contains a $C_4$ to $C_8$ aliphatic diol in an amount of 60 parts by mole with respect to 100 parts by mole of the total carboxylic acid component. This is because by using a component with four or more carbon atoms in an amount of 60 parts by mole or more, the crystallization of the polyester resin can be suppressed which is effective for the transparency and gloss and because by making the number of carbon atoms eight or less, the flexibility of the resin increases and the fixability of the toner to become good as a general tendency. The content of the $C_4$ to $C_8$ aliphatic diol is preferably at least 70 parts by mole.

Further, the linear polyester resin (b1) has a mass average molecular weight (Mw) in the range of 4,000 to 10,000. This is because by making the Mw at least 4,000, the strength of the resin becomes sufficient as a general tendency. Preferably, it is at least 5,000. Further, by making the Mw not more than 10,000, the low temperature fixability becomes good as a general tendency. Preferably, it is not more than 8,000.

Further, the linear polyester resin (b1) has a softening temperature in the range of 90 to 120° C. This is because by making the softening temperature at least 90° C., the blocking resistance of the toner becomes good as a general tendency. Preferably, it is at least 95° C. Further, by making the softening temperature not more than 120° C., the low temperature fixability of the toner becomes good as a general tendency. Preferably, it is not more than 110° C.

Further, the linear polyester resin (b1) has a glass transition temperature in the range of 40 to 70° C. This is because by making the glass transition temperature at least 40° C., the blocking resistance of the toner becomes good as a general tendency. Preferably, it is at least 50° C. Further, by making the glass transition temperature not more than 70° C., the low temperature fixability of the toner becomes good as a general tendency. Preferably, it is not more than 65° C.

Further, the linear polyester resin (b1) preferably has an acid value in the range of 0.5 to 30 mgKOH/g. This is because a resin with an acid value of less than 0.5 mgKOH/g is low in productivity as a general tendency. More preferably, it is at least 1 mgKOH/g. Further, if the acid value is over 30 mgKOH/g, the stability of the obtained toner image declines as a general tendency. More preferably, it is not more than 25 mgKOH/g.

Further, in the present invention, the softening temperature of the linear polyester resin (A) is preferably at least 20° C. higher than the softening temperature of the linear polyester resin (B). Due to this, the offset resistance of the toner becomes good as a general tendency. Being higher by at least 40° C. is more preferably and being higher by at least 50° C. is still more preferable.

The linear polyester resin (A) and the linear polyester resin (B) can be obtained by polymerization of the above discarboxylic acid or other acid component and the diol or other alcohol component by an esterification reaction or transesterification reaction and a condensation reaction. At the time of polymerization, for example, titanium tetrabutoxide, dibutyl tin oxide, tin acetate, zinc acetate, tin disulfide, antimony trioxide, germanium dioxide, or other polymerization catalysts may be used. Further, the polymerization temperature is preferably in the range of 180 to 290° C.

The progress of the polymerization reaction at the time of production of the polyester resin can be confirmed from the torque value of the stirring blades (turning by a constant speed) in the polymerization vessel, which rises along with an increase in the molecular weight (viscosity and softening temperature) of the resin in the reaction system. In this case, the time when a torque value corresponding to the softening temperature of the resin desired is reached may be used as the endpoint of the polymerization.

In particular, as the production conditions of the linear polyester resin (a1), it is particularly preferable to cause an esterification reaction between the dicarboxylic acid component and diol component at a temperature in the range of 250 to 280° C. and under a pressure in the range of 200 to 500 kPa, then cause condensation polymerization at a temperature in the range of 250 to 300° C. and higher than the esterification reaction temperature by at least 5° C. and under a pressure of not more than 1 kPa.

This is because by making the esterification reaction temperature at least 250° C., the reactivity of the dicarboxylic acid component and diol component becomes good and the amount of unreacted monomer can be reduced as a general tendency. More preferably, it is at least 260° C. Further, by making the esterification reaction temperature not more than 280° C., evaporation of the low boiling point monomer (diol component etc.) during the reaction can be suppressed and the amount of unreacted monomer can be reduced as a general tendency. More preferably, it is not more than 270° C.

Further, by making the pressure in the esterification reaction at least 200 kPa, distillation of the low boiling point monomer outside of the reaction system during the reaction can be suppressed and the amount of unreacted monomer can be reduced as a general tendency. More preferably, it is at least 250 kPa. On the other hand, by making it not more than 500 kPa, distillation of the water outside the reaction system, which occurs at the end of the esterification reaction, becomes easy and the reaction rate between the dicarboxylic acid component and diol component is raised as a general tendency. More preferably, it is not more than 450 kPa.

Further, by making the reaction temperature at the time of condensation polymerization following the esterification reaction at least 250° C., the polycondensation reactivity becomes good and a toner resin with a high softening temperature and an excellent offset resistance can be obtained as a general tendency. More preferably, it is at least 260° C. Further, by making the reaction temperature at the time of condensation polymerization not more than 300° C., the heat decomposition of the resin can be suppressed and a toner resin with a high softening temperature and an excellent offset resistance can be obtained as a general tendency. More preferably, it is not more than 290° C.

Further, by making the pressure at the time of condensation polymerization not more than 1 kPa, the polycondensation reactivity becomes good and a toner resin with a high softening temperature and excellent offset resistance can be obtained as a general tendency. More preferably, it is not more than 0.8 kPa.

Further, in the present invention, it is particularly preferable that the condensation polymerization be performed at a temperature at least 5° C. higher than the esterification reaction temperature. By performing the condensation polymerization at a temperature higher by at least 5° C., the distillation of the oligomer or unreacted component can be suppressed and the polycondensation reactivity becomes good, whereby a toner resin with a high softening temperature and an excellent offset resistance can be obtained as a general tendency.

Further, as the polymerization catalyst, one giving an amount of at least one type of metal atom selected from antimony, titanium, tin, zinc, and manganese of 50 to 5000 ppm with respect to the total acid component is preferably used. This is because by using an amount of polycondensation catalyst giving at least 50 ppm of metal atoms, a toner resin with a high softening temperature and an excellent offset resistance can be obtained as a general tendency. More preferably, it is at least 80 ppm. Further, by using an amount of not more than 5000 ppm, a toner resin excellent in gloss and free from coloration can be obtained as a general tendency. More preferably, it is not more than 4800 ppm.

The toner of the present invention use resin composition is preferably one containing the linear polyester resin (A) in an amount of 3 to 50 mass % and preferably is one containing the linear polyester resin (B) in an amount of 50 to 97 mass %.

This is because by making the linear polyester resin (A) 3 mass % or more, the offset resistance of the toner becomes good as a general tendency. Preferably, it is 5 mass % or more. On the other hand, by making it 50 mass % or less, the fixability of the toner becomes good as a general tendency. Preferably, it is 45 mass % or less.

Further, by making the linear polyester resin (B) 50 mass % or more, the fixability of the toner becomes good as a general tendency. Preferably, it is 55 mass % or more. On the other hand, by making it 97 mass % or less, the offset resistance of the toner becomes good as a general tendency. Preferably, it is 95 mass % or less.

The toner of the present invention contains the above-mentioned toner resin composition as a binding resin. The binding resin is preferably 80 to 100 mass % comprised of this toner resin composition. Another vinyl-based resin, cyclic olefin resin, epoxy resin, etc. may also be used together.

Among these, since the printing speed is lowered and the HOS offset becomes good as a general tendency, joint use of a vinyl-based resin (C) is preferable.

When jointly using a vinyl-based resin (C), the toner resin composition of the present invention preferably contains the linear polyester resin (A) in an amount of 3 to 50 mass %, the linear polyester resin (B) in an amount of 10 to 96 mass %, and the vinyl-based resin (C) in an amount of 1 to 40 mass %.

As the vinyl-based resin (C), a styrene-based resin, (meth) acrylic-based resin, styrene-acryl-based resin, etc. may be mentioned. Among these, from the viewpoint of making the offset resistance and chargeability good, a styrene-acryl-based resin or a (meth)acryl-based resin is preferable.

As the vinyl-based monomer forming the vinyl-based resin (C), for example, styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-densylstyrene, p-n-dodecylstyrene, p-phenylstyrene, 3,4-dicyclostyrene, and other styrene-based monomers or methyl (meth)acrylate, ethyl (meth)acrylate, n-butyl (meth) acrylate, isobutyl (meth)acrylate, t-butyl (meth)acrylate, propyl (meth)acrylate, 2-ethylhexyl (meth)acrylate, stearyl (meth)acrylate, and other (meth)acrylate alkyl ester-based monomers or (meth)acrylic acid, cinnamic acid, or other unsaturated monocarboxylic acids, maleic acid, fumaric acid, itaconic acid, or other unsaturated dicarboxylic acid-based monomers, monomethyl maleate, monoethyl maleate, monobutyl maleate, monomethyl fumarate, monoethyl fumarate, monobutyl fumarate, and other unsaturated carboxylic acid monoester-based monomers or dimethyl maleate, diethyl maleate, dibutyl maleate, dimethyl fumarate, diethyl fumarate, dibutyl fumarate, and other unsaturated dicarboxylic acid diester-based monomers may be mentioned.

These may be suitably selected and used alone or in mixtures. From the viewpoint of the chargeability or pulverizability, a styrene-based monomer is preferable, among which styrene is preferable. In particular, by making the upper limit on use of styrene in the vinyl-based resin (C) 85 mass %, the image forming ability of the toner can be further improved.

Further, from the viewpoint of the fixability, methyl (meth)acrylate, n-butyl (meth)acrylate, 2-ethylhexyl (meth) acrylate, stearyl (meth)acrylate, or another (meth)acrylic acid alkyl ester-based monomer is preferable.

The vinyl-based resin (C) is preferably one which does not substantially have any gel fraction. This "gel fraction" means THF (tetrahydrofuran) insolubles. This is because by the vinyl-based resin (C) not having any gel fraction, the fixability of the toner becomes good as a general tendency.

Further, the vinyl-based resin (C) is preferably one having a softening temperature in a range of 115 to 180° C. This is because by making the softening temperature 115° C. or more, the offset resistance of the toner becomes good as a general tendency. Preferably, it is 120° C. or more. Further, by making the softening temperature 180° C. or less, the fixability of the toner becomes good as a general tendency. Preferably, it is 170° C. or less.

Further, the vinyl-based resin (C) preferably has a Tg in the range of 50 to 70° C. By making Tg 50° C. or more, the blocking resistance of the toner becomes good as a general tendency. More preferably, it is 52° C. or more. By making Tg 70° C. or less, the fixability of the toner becomes good as a general tendency. More preferably, it is 68° C. or less.

Further, the vinyl-based resin (C) is preferably one having a mass average molecular weight Mw in the range of 40,000 to 400,000. By making the mass average molecular weight Mw 40,000 or more, the offset resistance of the toner becomes good as a general tendency. More preferably, it is 50,000 or more. By making the mass average molecular weight Mw 400,000 or less, the fixability of the toner becomes good as a general tendency. More preferably, it is 60,000 or less.

Further, the acid value of the vinyl-based resin (C) is preferably 40 mgKOH/g or less. Due to this, the image density of the toner is resistant to decline as a general tendency. More preferably, it is 30 mgKOH/g or less.

The vinyl-based resin (C) may be obtained by polymerizing the above-mentioned vinyl-based monomer by a method such as suspension polymerization, emulsion polymerization, block polymerization, solution polymerization, etc. As the initiator used at the time of polymerization, a peroxide-based initiator, azo-based initiator, redox-based initiator, etc. may be mentioned. An emulsifier, dispersant, dispersion aid, or solvent or other polymerization aid may be selected in accordance with need.

The toner of the present invention may further contain a release agent, coloring agent, charge controlling agent, flow modifier, magnetic body, etc.

As the release agent, for example, one having a melting point in the range of 60 to 100° C. is preferable. This is because by using one having a melting point of 60° C. or more, the blocking resistance of the toner becomes good as a general tendency. More preferably, it is 65° C. or more. Further, by using one having a melting point of 100° C. or less, the low temperature fixability of the toner becomes good as a general tendency. More preferably, it is 95° C. or less.

As a release agent having a melting point of 60 to 100° C., rice wax (melting point 79° C.), carnauba wax (melting point 83° C.), paraffin wax (melting point 60 to 90° C.), beeswax (melting point 64° C.), etc. may be mentioned.

These may be used suitably selected in accordance with need alone or in mixtures. In particular, ones having a needle penetration at 25° C. of 3 or less is preferable. This is because if using one having a needle penetration at 25° C. of 3 or less, the image stability of the toner becomes good as a general tendency.

The release agent can be blended in advance as an additive of the above-mentioned linear polyester resin (A) or linear polyester resin (B) enabling these polyester resins to be polymerized in the presence of a release agent. In particular, if polymerizing a resin in the presence of a release agent containing an alcohol component, part of the alcohol component reacts with the monomer component and the affinity of the polymer component and release agent component is improved. Due to this, dispersed size of the release agent component contained in the toner of the present invention can be made smaller and the offset resistance of the toner can be improved as a general tendency.

The needle penetration at 25° C. is 3 or less. As a release agent component containing an alcohol component, for example, rice wax, carnauba wax, etc. may be mentioned. Among these, carnauba wax is particularly preferably from the viewpoint of making the fixability good.

Further, the toner of the present invention, in accordance with need, may have another release agent blended into it. As the other release agent, a polypropylene-based wax, a polyethylene-based wax, a synthetic ester-based wax, a fatty acid amide, a silicone-based wax, etc. may be mentioned.

These release agents are preferably contained in a range of 1 to 10 mass % in the toner of the present invention. This is because by making the content of the release agent component 1 mass % or more, the offset resistance of the toner becomes good as a general tendency. More preferably, it is 1.5 mass % or more. Further, by making the content 10 mass % or less, the gloss and image stability of the toner become good as a general tendency. More preferably, it is 9 mass % or less.

As the coloring agent able to be used in the toner of the present invention, carbon black, Nigrosine, Aniline Blue, Phthalocyanine Blue, Phthalocyanine Green, Hansa Yellow, Rhodamine-based pigments, Chrome Yellow, quinacridone, Benzyl Yellow, Rose Bengal, triallyl methane-based dyes, monoazo-based, disazo-based, condensation azo-based dyes or pigments etc. may be mentioned. These dyes and pigments can be used alone or in mixtures of two or more types. In the case of a full color toner, as yellow, Benzyl Yellow, a monoazo-based pigment, a condensation azo-based pigment, etc., as magenta, quinacridone, rhodamine-based pigment, monoazo-based pigment, etc., and as cyan, Phthalocyanine Blue may be mentioned. The coloring agent is preferably used in an amount of 2 to 10 mass % in the toner from the viewpoint of the hue or image density and heat characteristics etc. of the toner.

As the charge controlling agent able to be used in the toner of the present invention, as a positive charge controlling agent, a quaternary ammonium salt, an organic substance having a basicity or electron donor property, etc. may be mentioned, while as the negative charge controlling agent, a metal chelate, metal-containing dye, acid or electron-demanding organic substance etc. may be mentioned. In the case of a color toner, it is important that the charge controlling agent be colorless or light in color and not obstruct the hue of the toner. For example, a chrome, zinc, aluminum, or other metal salt of salicylic acid or an alkyl salicyclic acid, metal complex, amide compound, phenol compound, naphthol compound, etc. may be mentioned. Further, a styrene-based, acryl acid-based, methacrylic acid-based, or vinyl polymer having a sulfonic acid group may also be used as the charge controlling agent. These charge controlling agents are preferably used in amounts of 0.5 to 5 mass % in the toner. This is because by making the charge controlling agent 0.5 mass % or more, the chargeability of the toner becomes a sufficient one in level and by making it 5 mass % or less, the drop in chargeability due to agglomeration of the charge controlling agent is suppressed as a general tendency.

As the flow modifier or other additive able to be used in the toner of the present invention, fine powder silica, alumina, titania, or other flow improver, magnetite, ferrite, cerium oxide, strontium titanate, conductive titania, or another inorganic fine powder, styrene resin, acryl resin, or other resistance adjuster, lubricant, etc. may be mentioned. These are used as internally added agents or externally added agents. These additives may be used in amounts of 0.05 to 10 mass % in the toner. By making the amounts of use of the additives 0.05 mass % or more, the effect of improvement of the properties of the toner is sufficiently obtained, while by making them 10 mass % or less, the image stability of the toner becomes good as a general tendency.

The toner of the present invention may be used for a magnetic single-component developer, a nonmagnetic single-component developer, or a 2-component developer. When used as a magnetic single-component developer, a magnetic body is included. As the magnetic body, for example, ferrite, magnetite, or other ferromagnetic alloys or other compounds including iron, cobalt, nickel, etc. or alloys not containing magnetic elements, but exhibiting ferromagnetism by suitable heat treatment such as manganese-copper-aluminum, manganese-copper-tin, or other so-called Huesler alloys containing manganese and copper, chrome dioxide, etc. may be mentioned. These magnetic bodies may be preferably used in a range of 40 to 60 mass % in the toner. By making the amount of the magnetic body 40 mass % or more, the amount of charging of the toner becomes a sufficient level as a general tendency, while making it 60 mass % or less, the fixability of the toner becomes good as a general tendency. Further, when using a two-component developer, a carrier is used together. As the carrier, iron powder, magnetite powder, ferrite powder, or other magnetic substances, these coated on their surfaces with a resin coating, magnetic carriers, and other known ones may be used. As the resin for covering the resin coated carrier, the generally known styrene-based resin, acryl-based resin, styrene acryl copolymer-based resin, silicone-based resin, modified silicone-based resin, fluorine-based resin, mixtures of these resins, etc. may be used.

The toner of the present invention may be produced for example by mixing the above-mentioned toner composition, a release agent, coloring agent, charge controlling agent, flow modifier, magnetic body, etc., then melt kneading them by a twin-screw extruder etc., roughly pulverizing the result, finely pulverizing it, classifying it, and, in accordance with need, hydrating the inorganic particles etc. In particular, in the kneading step, the temperature inside the cylinder of the extruder being higher than the softening temperature of the polyester-based resin is preferable. Further, in the above step, after the fine pulverization and classification, it is also possible to perform processing to make the toner particles spherical etc.

In the toner of the present invention, the Tg of the toner resin composition containing this is preferably in a range of 45 to 70° C. By making the Tg 45° C. or more, the blocking resistance of the toner becomes good as a general tendency. More preferably, it is 47° C. or more. By making the Tg 70° C. or less, the fixability of the toner becomes good as a general tendency. More preferably, it is 68° C. or less.

Further, the toner of the present invention preferably is one where the softening temperature of the toner resin composition containing it is in the range of 90 to 140° C. By making the softening temperature 90° C. or more, the offset resistance of the toner becomes good as a general tendency. More preferably, it is 95° C. or more, still more preferably 100° C. or more. By making the softening temperature 140° C. or less, the fixability of the toner becomes good as a general tendency. More preferably, it is 130° C. or less, still more preferably 120° C. or less.

Further, the toner of the present invention is preferably one where the melt viscosity at 120° C. of the toner resin composition containing it is in a range of 100 to 5000 Pa·s. By making the melt viscosity 100 Pa·s or more, the offset resistance of the toner becomes good as a general tendency. More preferably, it is 200 Pa·s or more. By making the melt viscosity 5000 Pa·s or less, the fixability and gloss of the toner becomes good as a general tendency. More preferably, it is 4600 Pa·s or less.

Further, the toner of the present invention preferably is one where the mass average molecular weight Mw of the toner resin composition containing it is in a range of 8,000 to 60,000. By making the mass average molecular weight Mw 8,000 or more, the offset resistance of the toner becomes good as a general tendency. More preferably, it is 10,000 or more. By making the mass average molecular weight Mw 60,000 or less, the fixability of the toner becomes good as a general tendency. More preferably, it is 50,000 or less.

Further, the toner of the present invention preferably has a glossiness in the range of 10 to 40. By making the glossiness 10 or more, the color formation of the toner becomes good and the gloss of the obtained image becomes good as a general tendency. More preferably, it is 20 or more, still more preferably 30 or more. Further, by making the glossiness 40 or less, the excessive color formation of the toner is suppressed and the image quality becomes good as a general tendency, so this is preferable.

Further, the toner of the present invention preferably has an average particle size of 7 μm or less. This is because by having the average particle size of the toner be 7 μm or less, an image excellent in offset resistance and excellent in gloss and resolution is obtained as a general tendency.

Next, the fifth aspect of the present invention will be explained.

In the fifth aspect of the invention, by using as the polyester resin (X) a linear polyester with a mass average molecular weight Mw of 25,000 to 100,000 and a softening temperature of 150 to 220° C. and using as the polyester resin (Y) a linear polyester with a mass average molecular weight Mw of 2,000 to 10,000 in weight ratio of the polyester resin (X) and the polyester resin (Y) in the range of 5:95 to 95:5, it is possible to obtain a toner with a minimum fixing temperature of 130° C. or less and a low temperature fixing range of 40° C. or more.

In general, the range of the fixing temperature becomes narrower the slower the roller speed as a general tendency. Therefore, with a low speed machine, the low temperature fixing range becomes narrower as a general tendency. The fifth aspect of the present invention relates to a toner able to secure a sufficient range of fixing temperature even with a low speed machine. The "minimum fixing temperature" referred to in the fifth aspect of the invention is the lowest temperature setting where no staining occurs when using a modified copier "PAGEPREST N4-612II" (made by Casio Electronics) and, while successively lowering the temperature setting of the heat roller, visually checking if the image printed on the top of A4 ordinary paper sticks to the roller and stains the blank part at the bottom of the paper. Further, the "range of the fixing temperature" is the difference between the maximum fixing temperature and the minimum fixing temperature. The "maximum fixing temperature" is the temperature where the glossiness of the fixed image, measured while successively raising the temperature setting of said heat roller, becomes the largest.

When the minimum fixing temperature of the toner exceeds 130° C., the temperature setting of the heat roller becomes high and the power consumption of the printer increases, so this is not desirable.

Further, when the range of the fixing temperature of the toner is less than 40° C., an offset phenomenon easily occurs when the temperature of the heat roller fluctuates, so this is not desirable.

In the fifth aspect of the present invention, the polyester resin (X) is not particularly limited so long as it is a linear polyester with a mass average molecular weight Mw of 25,000 to 100,000 and a softening temperature of 150 to 220° C., but making it the above-mentioned polyester resin (A) is preferable. Further, the polyester resin (Y) is not particularly limited so long as it is a linear polyester resin with a mass average molecular weight Mw of 2,000 to 10,000, but making it the above-mentioned polyester resin (B) is preferable.

Further, if using as the polyester resin (Y) two or more types of polyester differing in at least one of composition, mass average molecular weight, softening temperature, and Tg, the balance between the minimum fixing temperature and range of fixing temperature becomes good as a general tendency, so using as the polyester resin (Y) at least two types of polyester is preferable.

Further, when using as the polyester resin (Y) at least two types of polyester, these two types of polyester having a difference of the softening temperature of 5° C. or more is preferable. When using as the polyester resin (Y) at least two types of polyester having a difference of the softening temperature of 5° C. or more, the range of the fixing temperature can be made wider as a general tendency. The upper limit of the difference of the softening temperatures is not particularly limited, but 20° C. or less is preferable. If the difference of the softening temperature is 20° C. or less, the range of the fixing temperature becomes good as a general tendency.

The ratio of mixture of the polyester resin (X) and polyester resin (Y) is 5:95 to 95:5 (weight ratio). In the present invention, by using the polyester resin (X) and the polyester resin (Y) together and making the ratio of mixture the above ratio, it is possible to obtain a toner having a minimum fixing temperature of 130° C. or less and a range of the fixing temperature of 40° C. or more. This ratio of mixture is more preferably 10:90 to 90:10, particularly preferably 15:85 to 85:15.

Further, the contents of the polyester resin (X) and the polyester resin (Y) are not particularly limited, but a total amount of 50 mass % or more in the binding resin is preferable.

Below, examples of the present invention will be shown, but the present invention is not limited to these.

Further, the methods of evaluation of the resin and toner shown in the examples are as shown below.

Methods of Evaluation of Resin/Toner

1) Softening Temperature

Temperature when ½ of sample of 1.0 g flows out from 1 mmφ×10 mm nozzle measured using Shimadzu Flow Tester CFT-500 under load of 294N (30 kgf) at constant velocity temperature rise of speed of temperature rise of 3° C./min.

2) Acid Value

Value measured by titration method using KOH solution.

3) Mass Average Molecular Weight

Mass average molecular weight measured using gel permeation chromatography (made by Toso, HCL-8200) under the following measurement conditions.

Column conditions: G4000H×1 PG2000H×1

Oven temperature: 40° C.

Elutant: Tetrahydrofuran

Flow rate: 1 ml/min

Sample concentration: 0.4 mass %

Injected amount: 100 μl

Detector: RI

4) Melting Point

The endothermic peak when using a differential scan calorimeter for measurement at a speed of temperature rise of 5° C./min was used as the melting point.

5) Glass Transition Temperature

The temperature at the intersection of the base line of the chart when using a differential scan calorimeter for measurement at a speed of temperature rise of 5° C./min and the tangent of the endothermic curve near the transition temperature.

6) Melt Viscosity

Measured using REOLOGICA Rheometer "Dynalyser DAR-100", hardening sample in an amount of 1 g, sandwiching it between parallel 25 mmφ plates, adjusting it at a 150° C. temperature to a thickness of 0.5 to 1.0 mm, then raising the temperature from 80° C. to 250° C. at 3° C./min and measuring it at a frequency of 1 Hz and a strain of 1%.

7) Method of Evaluation of Offset Resistance

7)-1. Method of Evaluation 1 (Method of Evaluation for Medium Speed Printer)

A printer having a fixing roller not coated with silicone oil, set to a roller speed of 100 mm/sec, and able to be changed in temperature (a modified Casio PAGEPREST N4-612II copier) was used for printing and the offset resistance was evaluated. Further, the maximum temperature at the time when the toner transferred to the fixing roller at the time of fixing was deemed as the offset occurrence temperature and the offset resistance was judged using the following criteria.

VG (very good): offset occurrence temperature of 230° C. or more

G (good): offset occurrence temperature of 220° C. to less than 230° C.

F (fair): offset occurrence temperature of 200° C. to less than 220° C.

P (poor): offset occurrence temperature of less than 200° C.

7)-2. Method of Evaluation 2 (Method of Evaluation for Medium Speed and Low Speed Printers)

A printer having a fixing roller not coated with silicone oil, set to a roller speed of 100 mm/sec, and able to be changed in temperature (a modified Casio PAGEPREST N4-612II copier) was used for printing and the offset resistance was evaluated. Further, the maximum temperature at the time when the toner transferred to the fixing roller at the time of fixing was deemed as the offset occurrence temperature and the offset resistance was judged using the following criteria.

VG (very good): HOS occurrence temperature of 200° C. or more

G (good): HOS occurrence temperature of 185° C. to less than 200° C.

F (fair): HOS occurrence temperature of 175° C. to less than 185° C.

P (poor): HOS occurrence temperature of less than 175° C.

7)-3. Method of Evaluation 3 (Method of Evaluation for Low Speed Printers)

A printer having a fixing roller not coated with silicone oil, set to a roller speed of 50 mm/sec, and able to be changed in temperature (a modified Casio PAGEPREST N4-612II copier) was used for printing and the offset resistance was evaluated. Further, the maximum temperature at the time when the toner transferred to the fixing roller at the time of fixing was deemed as the offset occurrence temperature and the offset resistance was judged using the following criteria.

VG (very good): offset occurrence temperature of 230° C. or more

G (good): offset occurrence temperature of 220° C. to less than 230° C.

F (fair): offset occurrence temperature of 200° C. to less than 220° C.

P (poor): offset occurrence temperature of less than 200° C.

7)-4. Method of Evaluation 4 (Method of Evaluation for Low and Medium Speed Printers)

Using a modified copier "PAGEPREST N4-612II" (made by Casio Electronics), an unfixed image was produced and subjected to a test in the fixing temperature region. The fixing roller used here was a fixing roller on which silicone oil was not coated and was set to a nip of 3 mm and a linear speed of 70 mm/sec. While raising the heat roller temperature setting in 5° C. increments, it was visually checked if an image printed at the top part of A4 ordinary paper (made by Daishowa Paper, BM64T) stuck to the roller and stained the bottom blank part of the paper. This operation was repeated until 200° C. The fixed image was measured for glossiness at an incident angle of 75 degrees using a Nippon Denshoku Glossmeter PG-1. The glossiness increases along with a rise of the temperature setting, but falls after a certain temperature. In this way, the temperature setting where the glossiness begins to decline was deemed as the hot offset occurrence temperature and the temperature where the glossiness becomes maximum was used as the maximum fixing temperature. The temperature where the glossiness became maximum was used as the maximum fixing temperature.

8) Method of Evaluation of Fixability

8)-1. Method of Evaluation 1 (Method of Evaluation for Medium Speed Printers)

Under the same conditions as the Method of Evaluation 1 of the offset resistance, a toner was fixed to paper. The lowest temperature at which the toner starts to be fixed to the paper at this time was made the fixing temperature and a judgment made by the following criteria.

VG (very good): fixing temperature of less than 120° C.

G (good): fixing temperature of 120° C. to less than 130° C.

F (fair): fixing temperature of 130° C. to less than 160° C.

P (poor): fixing temperature of 160° C. or more

8)-2. Method of Evaluation 2 (Method of Evaluation for Medium Speed and Low Temperature Printers)

Under the same conditions as the Method of Evaluation 2 of offset resistance, a toner was fixed to paper. The lowest roller temperature at which cold offset does not occur at this time was used as the fixing start temperature and a judgment made by the following criteria.

VG (very good): fixing start temperature of 125° C. or less

G (good): fixing start temperature of over 125° C. to 135° C.

F (fair): fixing start temperature of over 135° C. to 145° C.

P (poor): fixing start temperature of over 145° C.

8)-3. Method of Evaluation 3 (Method of Evaluation for Low and Medium Speed Printers)

Under the same conditions as the Method of Evaluation 3 of offset resistance, a toner was fixed to paper. The lowest temperature where the toner starts to be fixed to the paper at this time was made the fixing temperature and a judgment made by the following criteria.

VG (very good): fixing temperature of less than 120° C.

G (good): fixing temperature of 120° C. to less than 130° C.

F (fair): fixing temperature of 130° C. to less than 160° C.

P (poor): fixing temperature of 160° C. or more

8)-4. Method of Evaluation 4 (Method of Evaluation for Low and Medium Speed Printers)

Based on the Method of Evaluation 4 of the offset resistance, a toner image was transferred and the above-mentioned heat roller fixing unit was used for fixing treatment. While lowering the heat roller temperature setting by 5° C. decrements, it was visually checked if an image printed at the top part of A4 ordinary paper (made by Daishowa Paper, BM64T) stuck to the roller and stained the bottom blank part of the paper. The lowest temperature setting where staining did not occur was used as the minimum fixing temperature.

9) Range of Fixing Temperature

The difference between the maximum fixing temperature and the minimum fixing temperature was used as the range of fixing temperature.

10) Blocking Resistance

The toner was weighed in an amount of about 5 g and placed in a sample bottle which was allowed to stand in a dryer held at 50° C. for about 24 hours. The degree of blocking of the toner was evaluated and this used as an indicator of the blocking resistance. The evaluation criteria were as follows.

VG (good): disperses by just turning sample bottle upside down

G (fair): disperses by turning sample bottle upside down and knocking it two or three times P (poor): disperses by turning sample bottle upside down and knocking it four or five times 11) Glossiness An image was fixed to a toner at 150° C. and measured using a Glossmeter PG-1 made by Nippon Denshoku. The glossiness was evaluated by the following criteria using the value measured at an incidence angle of 75 degrees.

VG (very good): glossiness of 30 to less than 40

G (good): glossiness of 20 to less than 30

F (fair): glossiness of 10 to less than 20

P (poor): glossiness of less than 10

12) 145° C. fixability

145° C. Fixability

An image fixed by setting the temperature of the fixing roller to 145° C. was rubbed nine times by a JIS S512 sand eraser. The image density before and after the test was measured by a Macbeth image densitometer. The fixing rate was calculated as Image density after test/image density before test× 100 (%) and an evaluation made by the following criteria.

VG (very good): 80% or more fixing rate

G (good): 75% to less than 80% fixing rate

F (fair): 70% to less than 75% fixing rate

P (poor): less than 70% fixing rate or COS caused at 145° C. and measurement not possible

PRODUCTION EXAMPLE 1

Production Examples of Linear Polyester Resin (A)

A monomer component of each of the prepared compositions shown in Table 1 and 2000 ppm of antimony trioxide with respect to the total acid component were charged into a reaction vessel equipped with a distillation tower. Next, while holding the speed of the rotary blades in the reaction vessel at 120 rpm, the temperature started to be raised. The reaction system was heated until its temperature became 265° C. and this temperature was maintained. Water was distilled off from the reaction system. About 7 hours after the start of the esterification reaction, water was no longer distilled off and the reaction was ended. Next, the temperature in the reaction system was lowered and held at 285° C. The inside of the reaction vessel was evacuated over about 40 minutes to a vacuum of 1.0 mmH. The condensation reaction was performed while distilling off the diol component from the reaction system. Along with the reaction, the viscosity of the reaction system rose. Along with the rise in viscosity, the vacuum degree was also raised. The condensation reaction was performed until the torque of the stirring blades reached a value of the desired softening temperature. Further, when the predetermined torque was exhibited, the reaction system was returned to ordinary pressure and the heating was stopped. Nitrogen was used to pressurize the chamber over about 40 min, then the reaction product was taken out to obtain each of the resins HA to HL.

The thus obtained resins HA to HL were analyzed for composition by liquid gas chromatography. The results showed that the resins had the compositions shown in Table 1. Further, the properties of the resins are similarly shown in Table 1.

TABLE 1

| Polyester Resin (A) | | | | | | |
|---|---|---|---|---|---|---|
| | Resin HA | Resin HB | Resin HC | Resin HD | Resin HE | Resin HF |
| Monomer prepared composition | | | | | | |
| Acid component (parts by mole) | | | | | | |
| Terephthalic acid | 90 | 60 | 60 | 75 | 60 | 60 |
| Isophthalic acid | 10 | 40 | 40 | 20 | 40 | 40 |
| Adipic acid | — | — | — | 5 | — | — |
| Anhydrous trimellitic acid | — | — | — | — | — | — |
| Alcohol component (parts by mole) | | | | | | |
| $C_3$ to $C_{10}$ aliphatic diol component | | | | | | |
| Neopentyl glycol | — | 20 | — | — | — | — |
| Propylene glycol | — | — | — | — | — | — |
| Cyclohexane dimethanol | 60 | 35 | 30 | 15 | 15 | 10 |
| Other components | | | | | | |
| Ethylene glycol | 80 | 75 | 110 | 125 | 125 | 130 |
| Diol A | — | — | — | — | — | — |
| Resin composition | | | | | | |
| Acid component (parts by mole) | | | | | | |
| Terephthalic acid | 89.8 | 60.3 | 60.2 | 75.0 | 59.6 | 60.0 |
| Isophthalic acid | 10.2 | 39.7 | 39.8 | 19.9 | 40.4 | 40.0 |
| Adipic acid | — | — | — | 5.1 | — | — |
| Trimellitic acid | — | — | — | — | — | — |
| Alcohol component (parts by mole) | | | | | | |
| $C_3$ to $C_{10}$ aliphatic diol component | | | | | | |
| Neopentyl glycol | — | 19.8 | — | — | — | — |
| Propylene glycol | — | — | — | — | — | — |
| Cyclohexane dimethanol | 59.9 | 35.1 | 30.5 | 15.2 | 15.3 | 10.1 |
| Other components | | | | | | |
| Ethylene glycol | 39.9 | 46.1 | 70.5 | 85.8 | 85.8 | 91.2 |
| Diol A | — | — | — | — | — | — |
| Resin properties | | | | | | |
| Softening temperature (° C.) | 160 | 180 | 190 | 175 | 210 | 219 |
| Tg (° C.) | 65.1 | 67.1 | 62.1 | 58.1 | 3.0 | 75.0 |
| Acid value (mgKOH/g) | 3.5 | 5.0 | 2.5 | 5.1 | 1.0 | 0.1 |
| Mass average molecular weight MW | 29,000 | 54,000 | 72,000 | 39,000 | 89,000 | 98.000 |
| Melting point (° C.) | None | None | None | None | None | None |
| | Resin HG | Resin HH | Resin HI | Resin HJ | Resin HK | Resin HL |
| Monomer prepared composition | | | | | | |
| Acid component (parts by mole) | | | | | | |
| Terephthalic acid | 60 | 60 | 65 | 67 | 60 | 70 |
| Isophthalic acid | 40 | 40 | 20 | 20 | 20 | 20 |
| Adipic acid | — | — | 15 | 13 | 20 | 5 |
| Anhydrous trimellitic acid | — | — | — | — | — | 5 |
| Alcohol component (parts by mole) | | | | | | |
| $C_3$ to $C_{10}$ aliphatic diol component | | | | | | |
| Neopentyl glycol | — | — | — | — | 80 | — |
| Propylene glycol | 30 | — | — | — | — | — |
| Cyclohexane dimethanol | — | — | 15 | 15 | — | 15 |

TABLE 1-continued

| Polyester Resin (A) | | | | | | |
|---|---|---|---|---|---|---|
| Other components | | | | | | |
| Ethylene glycol | 105 | 140 | 125 | 125 | 60 | 125 |
| Diol A | 5 | — | — | — | — | — |
| Resin composition<br>Acid component (parts by mole) | | | | | | |
| Terephthalic acid | 59.6 | 60.0 | 65.0 | 67.2 | 60.0 | 70.2 |
| Isophthalic acid | 40.4 | 40.0 | 19.9 | 20.1 | 19.9 | 20.0 |
| Adipic acid | — | — | 15.1 | 12.7 | 20.1 | 4.8 |
| Trimellitic acid | — | — | — | — | — | 5.0 |
| Alcohol component (parts by mole)<br>$C_3$ to $C_{10}$ aliphatic diol component | | | | | | |
| Neopentyl glycol | — | — | — | — | 79.5 | — |
| Propylene glycol | 29.8 | — | — | — | — | — |
| Cyclohexane dimethanol | — | — | 15.1 | 15.0 | 0 | 15.1 |
| Other components | | | | | | |
| Ethylene glycol | 66.0 | 101 | 85.9 | 86.0 | 21.5 | 85.9 |
| Diol A | 5.2 | — | — | — | — | — |
| Resin properties | | | | | | |
| Softening temperature (° C.) | 150 | 235 | 161 | 163 | 128 | 178 |
| Tg (° C.) | 65.1 | 78.0 | 50.2 | 52.5 | 46 | 54.0 |
| Acid value (mgKOH/g) | 3.0 | 0.1 | 4.2 | 5.3 | 8.3 | 11.5 |
| Mass average molecular weight MW | 26,000 | 120,000 | 40,000 | 40,000 | 20,000 | 210,000 |
| Melting point (° C.) | None | 230 | None | None | None | None |

* Diol A: polyoxypropylene(2.3)-2,2-bis(4-hydroxyphenyl)propane

PRODUCTION EXAMPLE 2

Production Examples of Linear Polyester Resin (B)

The monomer component of each of the prepared compositions shown in Table 2, additive, and 1000 ppm of dibutyl tin oxide with respect to the total acid component were charged into a reaction vessel equipped with a distillation tower. Next, while holding the speed of the rotary blades in the reaction vessel at 120 rpm, the temperature started to be raised. The reaction system was heated until its temperature became 260° C. and this temperature was maintained. Water was distilled off from the reaction system. About 8 hours after the start of the esterification reaction, water was no longer distilled off and the reaction was ended. Next, the temperature in the reaction system was lowered and held at 235° C. The inside of the reaction vessel was evacuated over about 40 minutes to a vacuum of 1.0 mmH. A condensation reaction was performed while distilling off the diol component from the reaction system. Along with the reaction, the viscosity of the reaction system rose. The condensation reaction was performed while repeating sampling until a value showing the desired softening temperature was shown. Further, at the point of time when the predetermined softening temperature was shown, the reaction system was returned to ordinary temperature, the heating was stopped, and nitrogen was used for pressurization and the reaction continued for about 40 minutes. The reaction product was then taken out to obtain each of the resins LA to LN.

The thus obtained resins LA to LN were analyzed for composition by liquid gas chromatography. The results showed them to be the resin compositions shown in Table 2. Further, the properties of the resin are similarly shown in Table 2.

TABLE 2

| | Polyester Resin (B) | | | | | | | | | | | | | |
|---|---|---|---|---|---|---|---|---|---|---|---|---|---|---|
| | Resin name | | | | | | | | | | | | | |
| | Resin LA | Resin LB | Resin LC | Resin LD | Resin LE | Resin LF | Resin LG | Resin LH | Resin LI | Resin LJ | Resin LK | Resin LL | Resin LM | Resin LN |
| Monomer prepared composition<br>Acid component (parts by mole) | | | | | | | | | | | | | | |
| Terephthalic acid | 85 | 85 | 85 | 85 | 85 | 80 | 60 | 60 | 50 | 50 | 60 | 100 | 85 | 100 |

TABLE 2-continued

| | Polyester Resin (B) | | | | | | | | | | | | | |
|---|---|---|---|---|---|---|---|---|---|---|---|---|---|---|
| | Resin name | | | | | | | | | | | | | |
| | Resin LA | Resin LB | Resin LC | Resin LD | Resin LE | Resin LF | Resin LG | Resin LH | Resin LI | Resin LJ | Resin LK | Resin LL | Resin LM | Resin LN |
| Isophthalic acid | 15 | 15 | 15 | 15 | 15 | 20 | 40 | 40 | 50 | 50 | 40 | — | 15 | — |
| Alcohol component (parts by mole) | | | | | | | | | | | | | | |
| $C_3$ to $C_{10}$ aliphatic diol component | | | | | | | | | | | | | | |
| Neopentyl glycol | 90 | 95 | 90 | 90 | 90 | 70 | — | — | 55 | 25 | — | 55 | 90 | 90 |
| Propylene glycol | 10 | — | — | — | — | — | 25 | 25 | — | — | — | — | — | 10 |
| Cyclohexane dimethanol | — | — | — | — | — | — | 35 | 30 | 55 | — | — | — | — | |
| Other components | | | | | | | | | | | | | | |
| Ethylene glycol | 5 | 10 | 15 | 13 | 11 | 35 | 45 | 60 | — | 115 | 140 | 10 | 15 | 5 |
| Diol A | — | — | — | — | — | — | — | — | — | — | — | 40 | — | |
| Additive (parts by mass) | | | | | | | | | | | | | — | |
| Carnauba wax | — | — | — | 0.8 | 3.5 | — | — | — | — | — | — | — | | |
| Resin composition | | | | | | | | | | | | | | |
| Acid component (parts by mole) | | | | | | | | | | | | | | |
| Terephthalic acid | 84.9 | 85.0 | 84.8 | 84.9 | 84.5 | 80.1 | 60.1 | 60.2 | 50.8 | 50.1 | 60 | 100 | 84.5 | 100 |
| Isophthalic acid | 15.1 | 15.0 | 15.2 | 15.1 | 15.5 | 19.8 | 39.9 | 39.8 | 49.2 | 49.9 | 40 | — | 15.5 | — |
| Alcohol component (parts by mole) | | | | | | | | | | | | | | |
| $C_3$ to $C_{10}$ aliphatic diol component | | | | | | | | | | | | | | |
| Neopentyl glycol | 89.3 | 94.5 | 88.2 | 88.1 | 89.1 | 69.8 | 25.1 | — | 50.2 | 24.9 | — | 55.2 | 89.1 | 89.9 |
| Propylene glycol | 10.7 | — | — | — | — | — | — | 25.0 | — | — | — | — | — | 10.1 |
| Cyclohexane dimethanol | — | — | — | — | — | — | 34.9 | 30.0 | 54.8 | — | — | — | — | |
| Other components | | | | | | | | | | | | | | |
| Ethylene glycol | 2.2 | 7.5 | 13.7 | 12.8 | 11.1 | 31.2 | 41.0 | 46.2 | — | 83.1 | 110 | 7.1 | 14.5 | 2.0 |
| Diol A | — | — | — | — | — | — | — | | — | — | — | 40.0 | — | |
| Additive (parts by mass) | | | | | — | — | — | | — | — | — | — | — | |
| Carnauba wax | — | — | — | 1.1 | 4.1 | — | — | | — | — | — | — | — | |

TABLE 2-continued

| | Polyester Resin (B) | | | | | | | | | | | | | |
|---|---|---|---|---|---|---|---|---|---|---|---|---|---|---|
| | Resin name | | | | | | | | | | | | | |
| | Resin LA | Resin LB | Resin LC | Resin LD | Resin LE | Resin LF | Resin LG | Resin LH | Resin LI | Resin LJ | Resin LK | Resin LL | Resin LM | Resin LN |
| Resin properties | | | | | | | | | | | | | | |
| Softening temperature (° C.) | 110 | 108 | 105 | 104 | 102 | 100 | 80 | 105 | 113 | 111 | 105 | 71 | 65 | 110 |
| Tg (° C.) | 69.5 | 67.0 | 58.0 | 54.5 | 48.0 | 52.0 | 45.0 | 57.0 | 63.1 | 54.0 | 52.0 | 40.5 | 35 | 72 |
| Acid value (mgKOH/g) | 16.0 | 17.0 | 18.0 | 20.1 | 23.0 | 22.0 | 25.0 | 17.5 | 5.0 | 18.0 | 4.0 | 29.5 | 35.0 | 3.0 |
| Mass average molecular weight MW | 9,800 | 9,500 | 8,500 | 7,100 | 6,500 | 5400 | 3000 | 8,200 | 12,000 | 8,900 | 5,400 | 2100 | 1,500 | 9,800 |
| Melting point (° C.) | None | None | None | None | None | None | None | None | None | None | 121 | None | None | None |

Diol A: polyoxypropylene (2.3)-2,2-bis(4-hydroxyphenyl)propane
Additive: (Prepared composition) Parts by mass with respect to 100 parts by mass of prepared monomer, (resin composition) parts by mass with respect to 100 parts by mass of obtained resin

EXAMPLE 1

The above obtained resins were used to make toners. Each toner was obtained by using the amount of linear polyester resin (A) and linear polyester resin (B) shown in Table 3, quinacridone pigment (made by Clariant, E02) in an amount of 5 parts by mass, carnauba wax (made by Toyo Petroride) in an amount of 5 parts by mass, and a negative charge controlling agent (made by Orient Chemical Industries, E-84) in an amount of 2 parts by mass mixed by a Henschel mixer for 30 minutes. Next, the obtained mixture was melt kneaded twice by a twin-screw kneader. The melt kneading was performed setting the inside temperature to 180° C. After kneading, the result was cooled to obtain a toner mass which was then finely pulverized by a jet mill fine pulverizer. A classifier was used to obtain a toner with a uniform particle size of an average particle size of 5 μm. The obtained fine powder was charged with 0.25% of silica (made by Nippon Aerogel, R-972) and mixed by a Henschel mixer to cause deposition and finally obtain each of the toners 1 to 18.

The obtained toners 1 to 18 were evaluated as toners using the same method of evaluation as above (however, the method of evaluation of the offset resistance and the method of evaluation of the fixability are both the methods of evaluation according to Evaluation Method 1). The results of evaluation of the toners are shown in Table 3.

TABLE 3

| Example 1 | | | | | | | | | | | | |
|---|---|---|---|---|---|---|---|---|---|---|---|---|
| Ratio of mixture of resin (parts by mass) | Toner name | ($C_3$ to $C_{10}$ aliphatic diol component of linear polyester resin B)/($C_3$ to $C_{10}$ aliphatic diol component of linear polyester resin A) | Mass average molecular weight Mw | Dif. of soft. temp. (° C.) | Soft. temp. (° C.) | 120° C. melt viscosity (Pa · s) | Tg (° C.) | Fixability | Offset resistance | Blocking resistance | Gloss |
| Resin HF:resin LA = 3:97 | 1 | 9.90 | 12450 | 109 | 113 | 724 | 69.7 | VG | G | VG | VG |
| Resin HE:resin LB = 5:95 | 2 | 6.18 | 13480 | 102 | 113 | 715 | 68.6 | VG | G | VG | VG |
| Resin HC:resin LC = 20:80 | 3 | 2.89 | 21200 | 85 | 122 | 1352 | 58.8 | G | G | G | VG |
| Resin HD:resin LC = 30:70 | 4 | 5.80 | 17650 | 70 | 126 | 1800 | 58.0 | G | G | G | VG |
| Resin HD:resin LC = 20:80 | 5 | 5.80 | 14600 | 70 | 119 | 1090 | 58.0 | G | G | G | VG |
| Resin HA:resin LG = 45:55 | 6 | 1.00 | 14700 | 80 | 116 | 880 | 54.0 | G | G | G | VG |
| Resin HG:resin LL = 50:50 | 7 | 1.85 | 14050 | 80 | 110 | 572 | 54.6 | VG | G | G | VG |
| Resin HE:resin LG = 45:55 | 8 | 3.92 | 41700 | 130 | 139 | 4405 | 57.6 | F | VG | G | F |
| Resin HA:resin LB = 45:55 | 9 | 1.58 | 18280 | 52 | 131 | 2650 | 66.1 | F | G | VG | G |
| Resin HG:resin LA = 50:50 | 10 | 3.36 | 17900 | 40 | 130 | 2397 | 67.3 | G | G | VG | G |
| Resin HE:resin LG = 5:95 | 11 | 3.92 | 8300 | 130 | 91 | 147 | 46.4 | VG | F | G | VG |
| Resin HG:resin LA = 3:97 | 12 | 3.36 | 10290 | 40 | 111 | 624 | 69.4 | VG | G | VG | VG |
| Resin HA:resin LB = 5:95 | 13 | 1.58 | 10480 | 52 | 111 | 598 | 66.9 | VG | G | VG | VG |
| Resin HJ:resin LG = 20:80 | 14 | 4.00 | 10400 | 83 | 97 | 219 | 46.5 | VG | G | G | VG |
| Resin HI:resin LG = 20:80 | 15 | 3.97 | 10400 | 81 | 96 | 213 | 46.0 | VG | G | F | VG |
| Resin HB:resin LH = 30:70 | 16 | 1.00 | 21940 | 75 | 128 | 2004 | 60.0 | G | G | VG | G |
| Resin HA:resin LH = 30:70 | 17 | 0.92 | 14440 | 55 | 122 | 1304 | 59.4 | F | G | G | VG |
| Resin HD:resin LF = 20:80 | 18 | 4.59 | 12120 | 75 | 115 | 819 | 53.2 | G | G | G | VG |

EXAMPLE 2

Except for using the amounts of the polyester resins of the toners shown in Table 4, the same procedure was followed as in Example 1 to obtain the toners 19 to 20.

The obtained toners 19 to 20 were evaluated as toners using the same method of evaluation as above (however, the method of evaluation of the offset resistance and the method of evaluation of the fixability are both the methods of evaluation according to Evaluation Method 1). The results of evaluation of the toners are shown in Table 4.

TABLE 4

Example 2

| Ratio of mixture of resins (parts by mass) | Toner name | ($C_3$ to $C_{10}$ aliphatic diol component of linear polyester resin B)/($C_3$ to $C_{10}$ aliphatic diol component of linear polyester resin A) | Mass average molecular weight Mw | Dif. of soft, temp. (° C.) | Soft. temp. (° C.) | 120° C. melt viscosity (Pa · s) | Tg (° C.) | Fixability | Offset resistance | Blocking resistance | Gloss |
|---|---|---|---|---|---|---|---|---|---|---|---|
| Resin HD:resin LD = 20:80 | 19 | 5.80 | 13480 | 71 | 118 | 1030 | 55.2 | VG | VG | G | VG |
| Resin HD:resin LE = 20:80 | 20 | 5.86 | 13000 | 73 | 117 | 918 | 50.0 | VG | VG | G | VG |

EXAMPLE 3

Except for using the amounts of the polyester resins of the toners shown in Table 5 and changing the amount of use of the carnauba wax to 15 parts by mass, the same procedure was followed as in Example 1 to obtain the toners 21 to 23.

The obtained toners 21 to 23 were evaluated as toners using the same method of evaluation as above (however, the method of evaluation of the offset resistance and the method of evaluation of the fixability are both the methods of evaluation according to Evaluation Method 1). The results of evaluation of the toners are shown in Table 5.

TABLE 5

Example 3

| Ratio of mixture of resins (parts by mass) | Toner name | ($C_3$ to $C_{10}$ aliphatic diol component of linear polyester resin B)/$C_3$ to $C_{10}$ aliphatic diol component of linear polyester resin A) | Mass average molecular weight Mw | Dif. of soft. temp. (° C.) | Soft. temp. (° C.) | 120° C. melt viscosity (Pa · s) | Tg (° C.) | Fixability | Offset resistance | Blocking resistance | Gloss |
|---|---|---|---|---|---|---|---|---|---|---|---|
| Resin HF:resin LL = 50:50 | 21 | 5.50 | 50000 | 150 | 124 | 1560 | 57.5 | G | VG | G | VG |
| Resin HE:resin LB = 45:55 | 22 | 6.20 | 45280 | 102 | 130 | 2467 | 69.7 | G | VG | VG | G |
| Resin HF:resin LA = 50:50 | 23 | 9.90 | 53900 | 109 | 139 | 4632 | 69 | F | VG | VG | F |

COMPARATIVE EXAMPLE 1

Except for using the amounts of the linear polyester resin (A) and the linear polyester resin (B) shown in Table 6 in the formulation of the toners, the same procedure was followed as in Example 1 to obtain the toners C1 to C4.

The obtained toners C1 to C4 were evaluated as toners using the same method of evaluation as above (however, the method of evaluation of the offset resistance and the method of evaluation of the fixability are both the methods of evaluation according to Evaluation Method 1). The results of evaluation of the toners are shown in Table 6.

TABLE 6

Comparative Example 1

| Mixing ratio of resin (parts by mass) | Toner name | ($C_3$ to $C_{10}$ aliphatic diol component linear polyester resin B)/($C_3$ to $C_{10}$ aliphatic diol component linear polyester resin A) | Mass average molecular weight Mw | Dif. of soft. temp. (° C.) | Soft. temp. (° C.) | 120° C. melt viscosity (Pa · s) | Tg (° C.) | Fixability | Offset resistance | Blocking resistance | Gloss |
|---|---|---|---|---|---|---|---|---|---|---|---|
| Resin HK:resin LJ = 30:70 | C1 | 0.31 | 12000 | 17 | 117 | 885 | 51.6 | P | P | G | G |
| Resin HF:resin LI = 3:97 | C2 | 10.40 | 11940 | 106 | 116 | 891 | 63.5 | G | P | VG | VG |
| Resin HH:resin LL = 30:70 | C3 | — | 37470 | 164 | 120 | 1188 | 51.8 | P | G | G | G |
| Resin HG:resin LK = 30:70 | C4 | 0 | 11580 | 45 | 119 | 1052 | 56.2 | P | G | G | VG |

COMPARATIVE EXAMPLE 2

Except for using the amounts of the linear polyester resin (A) and the linear polyester resin (B) shown in Table 7 in the formulation of the toners, the same procedure was followed as in Example 3 to obtain the toners C5 to C6.

The obtained toners C5 to C6 were evaluated as toners using the same method of evaluation as above (however, the method of evaluation of the offset resistance and the method of evaluation of the fixability are both the methods of evaluation according to Evaluation Method 1). The results of evaluation of the toners are shown in Table 7.

alcohol in an amount of 0.2 part by weight and stirred to dissolve the polyvinyl alcohol, then was charged with each of the monomer components shown in Table 8 and an initiator in a mixture. While holding the stirring speed at 200 rpm, the temperature in the polymerization reactor was raised to 80° C. over about 10 minutes and then held at 80° C. by controlling the outside wall temperature of the polymerization reactor. The reaction was continued for about 2 hours from when the outside wall temperature became higher than the temperature in the polymerization reactor, then the temperature was raised until the temperature inside the polymerization reactor reached 90° C. and was held there

TABLE 7

Comparative Example 2

| Mixing ratio of resin (parts by mass) | Toner name | ($C_3$ to $C_{10}$ aliphatic diol component of linear polyester resin B)/($C_3$ to $C_{10}$ aliphatic diol component of linear polyester resin A) | Mass average molecular weight Mw | Dif. of soft. temp. (° C.) | Soft. temp. (° C.) | 120° C. melt viscosity (Pa · s) | Tg (° C.) | Fixability | Offset resistance | Blocking resistance | Gloss |
|---|---|---|---|---|---|---|---|---|---|---|---|
| Resin LL = 100 | C5 | — | 2100 | — | 88 | 33 | 45.0 | VG | P | F | VG |
| Resin HB = 100 | C6 | — | 5400 | — | 152 | 85990 | 67.1 | P | VG | VG | P |

PRODUCTION EXAMPLE 3

Production Examples of Vinyl-Based Resin (C)

A polymerization reactor provided with a stirrer, thermometer, and reflux condenser was charged with deionized water in an amount of 200 parts by mass and polyvinyl for about 1 hour. After this, the temperature inside the polymerization reactor was cooled to 40° C. or less, then the resin was taken out from the polymerization reactor and sufficiently washed with deionized water to obtain each of the vinyl-based resins M1 to M5. The properties of the obtained resins M1 to M5 are shown in Table 8.

TABLE 8

| | | Resin name | | | | |
|---|---|---|---|---|---|---|
| | | M1 | M2 | M3 | M4 | M5 |
| Monomer component (parts by mass) | Methyl methacrylate | — | 40 | 58 | — | — |
| | n-butyl methacrylate | — | — | 40 | — | — |
| | Methacrylic acid | 1 | — | 2 | — | — |
| | 2-ethylhexyl acrylate | 19 | — | — | 20 | 20 |
| | Styrene | 80 | 60 | — | 80 | 80 |
| | Divinyl benzene | — | — | — | 0.45 | — |

TABLE 8-continued

| | | Resin name | | | | |
|---|---|---|---|---|---|---|
| | | M1 | M2 | M3 | M4 | M5 |
| Initiator (parts by mass) | Azobis butyl nitrile | 0.3 | 0.2 | 0.2 | — | — |
| | Benzoyl peroxide | — | — | — | 3.0 | 8.0 |
| Resin properties | Softening temperature (° C.) | 120 | 163 | 170 | 185 | 110 |
| | Tg (° C.) | 59.0 | 90.3 | 68.0 | 65.3 | 54.0 |
| | Acid value (mgKOH/g) | 7.5 | 0.1 | 14.0 | 1.0 | 3.0 |
| | Gel percent (%) | 0 | 0 | 0 | 40.3 | 0 |
| | Mass average molecular weight Mw | 40,000 | 65,000 | 200,000 | 900,000 | 10,000 |

EXAMPLE 4

The above obtained resins were used to make toners. Each toner was obtained by using the amount of linear polyester resin (A), linear polyester resin (B), and vinyl-based resin (C) shown in Table 9, quinacridone pigment (made by Clariant, E02) in an amount of 5 parts by mass, carnauba wax (made by Toyo Petroride) in an amount of 5 parts by mass, a negative charge controlling agent (made by Orient Chemical Industries, E-84) in an amount of 2 parts by mass mixed by a Henschel mixer for 30 minutes. Next, the obtained mixture was melt kneaded twice by a twin-screw kneader. The melt kneading was performed setting the inside temperature to 180° C. After kneading, the result was cooled to obtain a toner mass which was then finely pulverized by a jet mill fine pulverizer. A classifier was used to obtain a toner with a uniform particle size of an average particle size of 5 μm. The obtained fine powder was charged with 0.25% silica (made by Nippon Aerogel, R-972) and mixed by a Henschel mixer to cause deposition and finally obtain each of the toners 24 to 35.

The obtained toners 24 to 35 were evaluated as toners using the same method of evaluation as above (however, the method of evaluation of the offset resistance and the method of evaluation of the fixability are both the methods of evaluation according to Evaluation Method 3). The results of evaluation of the toners are shown in Table 9.

TABLE 9

| Example 4 | | | | | | | | | | | | |
|---|---|---|---|---|---|---|---|---|---|---|---|---|
| Toner | Resin (A) (parts by mass) | Resin (B) (parts by mass) | Resin (C) (parts by mass) | Ratio of comp. | (A) − (B) soft. temp. dif. (° C.) | Toner soft. temp. (° C.) | Toner melt viscosity (120° C., Pa · s) | Toner Tg (° C.) | Fixability (Eval. Method 3) | Offset resistance (Eval. Method 3) | Blocking resistance | Gloss |
| 24 | Resin HC:19 | Resin LC:76 | Resin M3:5 | 2.89 | 5 | 125 | 1452 | 59.3 | VG | F | G | VG |
| 25 | Resin HC:16 | Resin LC:64 | Resin M2:20 | 2.89 | 85 | 130 | 1510 | 64.6 | G | VG | VG | G |
| 26 | Resin HC:21 | Resin LC:56 | Resin M2:30 | 2.89 | 85 | 134 | 1699 | 68.0 | G | VG | VG | G |
| 27 | Resin HC:12 | Resin LC:48 | Resin M1:40 | 2.89 | 85 | 121 | 1400 | 58.0 | VG | VG | G | F |
| 28 | Resin HD:21 | Resin LC:49 | Resin M3:30 | 5.80 | 70 | 139 | 4500 | 61.0 | V | VG | VG | F |
| 29 | Resin HD:16 | Resin LC:64 | Resin M2:20 | 5.80 | 70 | 127 | 2100 | 64.5 | G | VG | VG | VG |
| 30 | Resin HB:24 | Resin LH:56 | Resin M2:20 | 1.00 | −75 | 135 | 1800 | 64.0 | G | VG | VG | G |
| 31 | Resin HA:24 | Resin LH:56 | Resin M2:20 | 0.92 | 55 | 130 | 1450 | 63.5 | G | VG | VG | G |
| 32 | Resin HD:19 | Resin LD:76 | Resin M2:5 | 5.80 | 71 | 118 | 1030 | 52.2 | VG | VG | G | VG |
| 33 | Resin HE:4.5 | Resin LC:85.5 | Resin M1:10 | 5.88 | 105 | 113 | 710 | 63.0 | VG | F | VG | G |
| 34 | Resin HJ:18 | Resin LD:72 | Resin M1:10 | 5.87 | 59 | 97 | 220 | 47.0 | VG | F | F | VG |
| 35 | Resin HA:45 | Resin LH:50 | Resin M1:5 | 0.92 | 55 | 116 | 880 | 54.5 | G | G | G | G |

Ratio of composition: in case of total weight of total acid component as 100 parts by mole, value of (parts by mole of $C_3$ to $C_{10}$ aliphatic diol component in linear polyester resin (B))/(parts by mole of $C_3$ to $C_{10}$ aliphatic diol component in polyester resin (A))

COMPARATIVE EXAMPLE 3

Except for using the amounts of the linear polyester resin (A), linear polyester resin (B), and vinyl-based resin (C) shown in Table 10 in the formulation of the toner, the same procedure was followed as in Example 5 to obtain the toner C10.

The obtained toner C10 was evaluated as a toner using the same method of evaluation as in Example 5 (however, the method of evaluation of the offset resistance and the method of evaluation of the fixability are both the methods of evaluation according to Evaluation Method 3). The results of evaluation of this toner are shown in Table 10.

TABLE 10

| Comparative Example 3 | | | | | | | | | | | | |
|---|---|---|---|---|---|---|---|---|---|---|---|---|
| Toner | Resin (A) (parts by mass) | Resin (B) (parts by mass) | Resin (C) (parts by mass) | Ratio of comp. | (A) − (B) soft. temp. dif. (° C.) | Toner soft. temp. (° C.) | Toner melt viscosity (120° C., Pa · s) | Toner Tg (° C.) | Fixability (Eval. Method 3) | Nonoffsettability (Eval. Method 3) | Blocking resistance | Gloss |
| C10 | Resin HH:55 | Resin LH:35 | Resin M1:10 | — | 130 | 170 | 95000 | 72.0 | P | VG | VG | P |

Ratio of composition: in case of total weight of total acid component as 100 parts by mole, value of (parts by mole of $C_3$ to $C_{10}$ aliphatic diol component in linear polyester resin (B))/(parts by mole of $C_3$ to $C_{10}$ aliphatic diol component in polyester resin (A))

PRODUCTION EXAMPLE 4

Production Examples of Linear Polyester Resin (B)

A monomer component of each of the prepared compositions of Table 11 and 500 ppm of antimony trioxide with respect to the total acid component were charged into a reaction vessel equipped with a distillation tower. Next, while holding the speed of the stirring blades in the reaction vessel at 120 rpm, the temperature started to be raised and the reaction system was heated until the temperature reached 260° C. and this temperature was held. Water was distilled off from the reaction system. About 8 hours after the esterification reaction started, the water was no longer distilled off and the reaction was ended. Next, the temperature in the reaction system was lowered and held at 230° C., the inside of the reaction vessel was evacuated over about 40 minutes to a vacuum of 1.0 mmHg, and a condensation reaction was performed while distilling off the diol component from the reaction system. Along with the reaction, the viscosity of the reaction system rose. The softening temperature of the resin in the reaction system was tracked and the condensation reaction performed until a value showing the desired softening temperature. When a predetermined softening temperature was exhibited, the reaction system was returned to ordinary pressure, the heating was stopped, nitrogen was used to pressurize the system over about 2 hours, and the reaction product was taken out. This was further gradually cooled over 2 hours to obtain each of the resins LO to LV. The results of analysis of the composition of each of the obtained resins by liquid gas chromatography and the values of the physical properties of the resins are shown in the same Table 11.

TABLE 11

| | | Resin 1 LO | Resin 1 LP | Resin 1 LQ | Resin LR | Resin LS | Resin 1 LT | Resin LU | Resin LV |
|---|---|---|---|---|---|---|---|---|---|
| Prepared composition (parts by mole) | Terephthalic acid | 85 | 85 | 85 | 85 | 50 | 50 | 85 | 85 |
| | Isophthalic acid | 15 | 15 | 15 | 15 | 50 | 50 | 15 | 15 |
| | Neopentyl glycol | 90 | 90 | 80 | 70 | 30 | | 80 | 80 |
| | Ethylene glycol | 15 | 30 | 40 | 40 | 90 | 70 | 40 | 40 |
| | Propylene glycol | | | | | | 50 | | |
| | Carnauba wax (mass %) | 0.86 | | | | | | | |
| Resin composition (parts by mole) | Terephthalic acid | 85 | 85 | 85 | 85 | 50 | 50 | 85 | 85 |
| | Isophthalic acid | 15 | 15 | 15 | 15 | 50 | 50 | 15 | 15 |
| | Neopentyl glycol | 89 | 87 | 77 | 68 | 28 | | 77 | 77 |
| | Ethylene glycol | 12 | 15 | 25 | 33 | 74 | 53 | 24 | 25 |
| | Propylene glycol | | | | | | 49 | | |
| | Carnauba wax (mass %) | 1 | | | | | | | |
| Physical properties | Mw | 6600 | 6400 | 5700 | 7000 | 7200 | 6400 | 15000 | 3500 |
| | Tg | 53.8 | 50.7 | 46.3 | 56.9 | 49.5 | 53.1 | 60.7 | 35 |
| | Softening temperature | 104 | 100 | 97 | 109 | 107 | 103 | 124 | 85 |

TABLE 11-continued

| | Resin 1 LO | Resin 1 LP | Resin 1 LQ | Resin LR | Resin LS | Resin 1 LT | Resin LU | Resin LV |
|---|---|---|---|---|---|---|---|---|
| Acid value (mgKOH/g) | 20 | 1.1 | 2.3 | 6.8 | 1.1 | 1.2 | 0.7 | 5.5 |

Carnauba wax: (Prepared composition) ratio of content in prepared composition combining monomer components
(Resin composition) ratio of content in obtained resin

EXAMPLE 5

The above obtained polyester resins LO to LR were used to make toners. Each toner was obtained by using a polyester resin in an amount of 93 parts by mass, quinacridone pigment (made by Clariant, E02) in an amount of 3 parts by mass, carnauba wax (made by Toyo Petroride) in an amount of 3 parts by mass, and a negative charge controlling agent (made by Orient Chemical Industries, E-84) in an amount of 1 part by weight mixed by a Henschel mixer for 30 minutes. Next, the obtained mixture was melt kneaded twice by a twin-screw kneader. The melt kneading was performed setting the inside temperature to the softening temperature of the resin. After kneading, the result was cooled to obtain a toner mass which was then finely pulverized by a jet mill fine pulverizer. A classifier was used to obtain a toner with a uniform particle size of an average particle size of 5 μm. The obtained fine powder was charged with 0.25% of silica (made by Nippon Aerogel, R-972) and mixed by a Henschel mixer to cause deposition and finally obtain each of the toners 36 to 39.

The obtained toners were evaluated as toners using the same method of evaluation as above (however, the method of evaluation of the offset resistance and the method of evaluation of the fixability are both the methods of evaluation according to Evaluation Method 2). The results of evaluation are shown in Table 12.

COMPARATIVE EXAMPLE 4

Except for changing the polyester resin to the resins LS to LV, the same procedure was followed as in Example 5 to produce the toners C11 to C14. The results of evaluation are shown in Table 12.

TABLE 12

Example 5 and Comparative Example 4

| Toner | Binding resin used | Fixability (Evaluation Method 2) | HOS resistance (Evaluation Method 2) | 145° C. fixability | Blocking resistance |
|---|---|---|---|---|---|
| 36 | Resin LO | VG | F | VG | G |
| 37 | Resin LP | VG | F | G | G |
| 38 | Resin LQ | VG | F | VG | F |
| 39 | Resin LR | G | F | F | VG |
| C11 | Resin LS | G | F | P | F |
| C12 | Resin LT | G | F | P | G |
| C13 | Resin LU | F | G | P | VG |
| C14 | Resin LV | VG | P | VG | F |

PRODUCTION EXAMPLE 5

Production Examples of Linear Polyester Resin (X)

A monomer component of each of the prepared compositions of Table 13 and 1500 ppm of antimony trioxide with respect to the total acid component were charged into a reaction vessel equipped with a distillation tower. Next, the temperature started to be raised and the reaction system was heated until the temperature reached 265° C. and this temperature was held. The reaction was continued until water was no longer distilled off from the reaction system. Next, the temperature in the reaction system was made 285° C., the inside of the reaction vessel was evacuated, and a condensation reaction was performed while distilling off the diol component from the reaction system. Along with the reaction, the viscosity of the reaction system rose. The condensation reaction was performed until the torque of the stirring blades reached a value of the desired softening temperature. When a predetermined torque was exhibited, the reaction product was taken out and cooled to obtain each of the resins 1a to 1f. The properties of the polyester resins are shown in Table 13.

TABLE 13

Linear Polyester Resin (X)

| | | Resin 1a | Resin 1b | Resin 1c | Resin 1d | Resin 1e | Resin 1f |
|---|---|---|---|---|---|---|---|
| Prepared composition (parts by mole) | Terephthalic acid | 77 | 77 | 77 | 77 | 75 | 72 |
| | Isophthalic acid | 20 | 20 | 20 | 20 | 20 | 20 |
| | Adipic acid | 3 | 3 | 3 | 3 | 5 | 8 |
| | Ethylene glycol | 105 | 105 | 105 | 105 | 105 | 105 |
| | Cyclohexane dimethanol | 15 | 15 | 15 | 15 | 15 | 15 |
| Physical properties | Mass average molecular weight (Mw) | 23000 | 40000 | 53000 | 66000 | 56000 | 66000 |
| | Glass transition temperature (° C.) | 57 | 60 | 62 | 65 | 59 | 55 |
| | Softening temperature (° C.) | 148 | 161 | 175 | 183 | 173 | 175 |
| | Acid value (mgKOH/g) | 2 | 2 | 2 | 2 | 2 | 3 |

PRODUCTION EXAMPLE 6

Production Examples of Linear Polyester Resin (Y)

A monomer component of each of the prepared compositions shown in Table 14, a release agent component (carnauba wax), and 1000 ppm of dibutyl tin oxide with respect to the total acid component were charged into a reaction vessel equipped with a distillation tower. Next, the temperature started to be raised and the reaction system was heated until the temperature reached 265° C. This temperature was held and the reaction continued until water was no longer distilled off from the reaction system. Next, the temperature in the reaction system was held at 235° C., the inside of the reaction vessel was evacuated, and the condensation reaction performed until the diol component was no longer distilled off from the reaction system. Along with the reaction, the viscosity of the system rose. While repeatedly taking samples, the condensation reaction was performed until reaching a value indicating the desired softening temperature. When a predetermined softening temperature was exhibited, the reaction product was taken out and cooled to obtain each of the resins 2a to 2 g. The properties of the resins are shown in Table 14.

TABLE 14

| | | Linear Polyester Resin (Y) | | | | | | |
|---|---|---|---|---|---|---|---|---|
| | | Resin 2a | Resin 2b | Resin 2c | Resin 2d | Resin 2e | Resin 2f | Resin 2g |
| Prepared composition (parts by mole) | Terephthalic acid | 50 | 80 | 85 | 84 | 100 | 100 | 100 |
| | Isophthalic acid | 50 | 20 | 15 | 8 | — | — | — |
| | Adipic acid | — | — | — | 8 | — | — | — |
| | Ethylene glycol | 67 | 22 | 15 | 20 | 18 | 25 | 25 |
| | Cyclohexane dimethanol | 40 | 20 | — | — | — | — | — |
| | Heopentyl glycol | — | 65 | 90 | 88 | — | — | — |
| | Diol A | — | — | — | — | 50 | 50 | 50 |
| | Diol B | — | — | — | — | 40 | 40 | 40 |
| | Carnauba wax (mass %) | 1 | 4 | 1 | — | 2 | 1 | — |
| Physical properties | Mass average molecular weight (Mw) | 6100 | 7400 | 6000 | 13800 | 5400 | 5000 | 4800 |
| | Glass transition temperature (° C.) | 49 | 49 | 50 | 55 | 51 | 48 | 51 |
| | Softening temperature (° C.) | 108 | 103 | 100 | 117 | 97 | 92 | 92 |
| | Acid value (mgKOH/g) | 12 | 11 | 15 | 32 | 16 | 16 | 16 |

Diol A: Polyoxypropylene-(2.2)-2,2-bis(4-hydroxyphenyl)propane
Diol B: Polyoxyethylene-(2.0)-2,2-bis(4-hydroxyphenyl)propane

EXAMPLE 6

A binding resin comprised of each of the combinations and blended amounts of polyester resins shown in Table 15 in a total amount of 93 parts by mass, a quinacridone pigment (made by Clariant, E02) in an amount of 3 parts by mass, carnauba wax (made by Toyo Petroride) in an amount of 3 parts by mass, and a negative charge controlling agent (made by Japan Carlit, LR-147) in an amount of 1 part by weight were mixed in advance. The obtained mixture was melt kneaded using a twin-screw kneader at 160° C., roughly pulverized, then finely pulverized by a jet mill fine pulverizer. A classifier was used to obtain a toner with a uniform particle size of an average particle size of 5 μm. The obtained fine powder was charged with 0.2 mass % of silica (made by Japan Aerogel, R-972) and mixed by a Henschel mixer to cause deposition and finally obtain each of the toners 40 to 47. Each toner was loaded on a nonmagnetic single-component dry type copier and the initial image obtained for evaluation of its performance (however, the method of evaluation of the offset resistance and the method of evaluation of the fixability are both the methods of evaluation according to Evaluation Method 4). The results of evaluation of the obtained toners 40 to 47 are shown in Table 16.

As will be understood from the above results, the toners 40 to 47 of the present invention exhibited good low temperature fixabilities at 130° C. or less even at a low or medium speed of a linear speed of 70 mm/s and simultaneously expressed a high hot offset temperature and maximum fixing temperature, so exhibited a broad range of fixing temperature of 40° C. or more.

COMPARATIVE EXAMPLE 5

Except for using as the binding resins a total 93 parts by mass of the combinations and amounts blended of polyester resin shown in Table 15, the same procedure was followed as in Example 6 to obtain the toners C15 to C17. Their performances were evaluated (however, the method of evaluation of the offset resistance and the method of evaluation of the fixability are both the methods of evaluation according to Evaluation Method 4). The results are shown in Table 16.

The toner C15 uses a polyester resin (X) with a softening temperature of less than 150° C. and has a mass average molecular weight of less than 25,000, so the hot offset temperature and maximum fixing temperature become low and as a result the range of the fixing temperature becomes a narrow 35° C.

The toner C16 has an amount blended of the polyester resin (X) of less than 5 parts by mass, so the hot offset temperature and maximum fixing temperature become low and as a result the fixing temperature range becomes a narrow 10° C.

The toner C17 uses as the polyester resin (X) one having a mass average molecular weight of over 10,000, so the minimum fixing temperature becomes a high 150° C. and the low temperature fixability is poor.

TABLE 15

| | Toner Use Binding Resin | | | | | | | | |
|---|---|---|---|---|---|---|---|---|---|
| | Polyester resin (X) | | | Polyester resin (Y) | | | Polyester (Y) | | |
| | No. | Soft. point (° C.) | Amount blended (parts by mass) | No. | Soft. point (° C.) | Amount blended (parts by mass) | No. | Soft. point (° C.) | Amount blended (parts by mass) |
| Toner 40 | 1c | 175 | 20 | 2e | 97 | 40 | 2a | 108 | 40 |
| Toner 41 | 1e | 173 | 20 | 2e | 97 | 40 | 2a | 108 | 40 |
| Toner 42 | 1c | 175 | 20 | 2c | 100 | 40 | 2a | 108 | 40 |
| Toner 43 | 1f | 175 | 20 | 2g | 92 | 40 | 2b | 103 | 40 |
| Toner 44 | 1f | 175 | 20 | 2e | 97 | 40 | 2a | 108 | 40 |
| Toner 45 | 1b | 161 | 30 | 2e | 97 | 70 | — | — | — |
| Toner 46 | 1c | 175 | 30 | 2f | 92 | 70 | — | — | — |
| Toner 47 | 1d | 183 | 30 | 2f | 92 | 70 | — | — | — |
| Toner C15 | 1a | 148 | 30 | 2e | 97 | 70 | — | — | — |
| Toner C16 | 1c | 175 | 3 | 2e | 97 | 97 | — | — | — |
| Toner C17 | 1c | 175 | 20 | 2d | 115 | 80 | — | — | — |

TABLE 16

| | Results of Toner Evaluation | | | |
|---|---|---|---|---|
| | Minimum fixing temperature (° C.) | Hot offset temperature (° C.) | Maximum fixing temperature (° C.) | Fixing temperature range (° C.) |
| Toner 40 | 130 | 185 | 180 | 50 |
| Toner 41 | 130 | 175 | 175 | 45 |
| Toner 42 | 130 | 185 | 180 | 50 |
| Toner 43 | 125 | 170 | 165 | 40 |
| Toner 44 | 130 | 185 | 185 | 55 |
| Toner 45 | 130 | 175 | 175 | 45 |
| Toner 46 | 125 | 180 | 175 | 50 |
| Toner 47 | 130 | 185 | 170 | 40 |
| Toner C15 | 130 | 165 | 165 | 35 |
| Toner C16 | 130 | 140 | 140 | 10 |
| Toner C17 | 150 | >200 | >200 | >50 |

INDUSTRIAL APPLICABILITY

The present invention is useful for technology for development of electrostatic images or magnetic latent images in electrophotography, electrostatic recording, and electrostatic printing.

The invention claimed is:

1. A toner resin composition comprising a linear polyester resin (A) containing a $C_3$ to $C_{10}$ aliphatic diol component and having a softening temperature in the range of 150 to 220° C. and a linear polyester resin (B) containing a $C_3$ to $C_{10}$ aliphatic diol component which differs from said linear polyester resin (A), the (parts by mole of the $C_3$ to $C_{10}$ aliphatic diol component in the linear polyester resin (B))/(parts by mole of the $C_3$ to $C_{10}$ aliphatic diol component in the linear polyester resin (A)) in the case of designating the total acid component of the resin as 100 parts by mole being in a range of 0.5 to 10.

2. A toner resin composition comprising a linear polyester resin (A) containing a $C_3$ to $C_{10}$ aliphatic diol component and having a softening temperature in the range of 150 to 220° C., a linear polyester resin (B) containing a $C_3$ to $C_{10}$ aliphatic diol component which differs from said linear polyester resin (A), and a vinyl-based resin (C), the (parts by mole of the $C_3$ to $C_{10}$ aliphatic diol component in the linear polyester resin (B))/(parts by mole of the $C_3$ to $C_{10}$ aliphatic diol component in the linear polyester resin (A)) in the case of designating the total acid component of the resin as 100 parts by mole being in a range of 0.5 to 10.

3. A toner resin composition as set forth in claim 1, comprising the linear polyester resin (A) in an amount of 3 to 50 mass %.

4. A toner resin composition as set forth in claim 2, comprising the linear polyester resin (A) in an amount of 3 to 50 mass %, the linear polyester (B) in an amount of 10 to 96 mass %, and the vinyl-based resin (C) in an amount of 1 to 40 mass %.

5. A toner resin composition as set forth in any one of claims 1 to 4, wherein the linear polyester resin (A) has a softening temperature in a range of 150 to 220° C.

6. A toner resin composition as set forth in claim 1, wherein a softening temperature of the linear polyester resin (A) is 20° C. or more higher than the softening temperature of the linear polyester resin (B).

7. A toner resin composition as set forth in claim 1, wherein the $C_3$ to $C_{10}$ aliphatic diol component is a component containing at least one type of a diol selected from neopentyl glycol, propylene glycol, and cyclohexane dimethanol.

8. A toner resin composition as set forth in claim 1, wherein the linear polyester resin (A) is a linear polyester resin (a) which contains, when the total acid component is designated as 100 parts by mole, the $C_3$ to $C_{10}$ aliphatic diol component in an amount of 10 to 60 parts by mole, has a glass transition temperature of 50 to 75° C., has a mass average molecular weight Mw of 25,000 to 100,000, and has no melting point, and the linear polyester resin (B) is a linear polyester resin (b) which contains, when the total acid component is designated as 100 parts by mole, the $C_3$ to $C_{10}$ aliphatic diol component in an amount of 55 to 100 parts by mole, has a glass transition temperature of 40 to 70° C., has a mass average molecular weight Mw of 2,000 to 10,000, and has no melting point.

9. A toner resin composition as set forth in claim 1, wherein a glass transition temperature measured after conversion into a toner is 45 to 70° C., the softening temperature is 90 to 140° C., a melt viscosity at 120° C. is 100 to 5000 Pa·s, and a mass average molecular weight Mw is 8,000 to 60,000.

10. A toner containing a toner resin composition as set forth in claim 1 as a binding resin.

11. A toner linear polyester resin (a1) comprising a $C_3$ to $C_{10}$ aliphatic diol component in an amount of 10 to 30.5 parts by mole with respect to 100 parts by mole of the total carboxylic acid component, having a glass transition temperature in a range of 50 to 75° C., having a mass average molecular weight Mw in a range of 25,000 to 100,000, not having a melting point, having a softening temperature in a range of 150 to 220° C., and having an acid value of 10 mgKOH/g or less.

12. A toner use linear polyester resin (a1) as set forth in claim 11, wherein the $C_3$ to $C_{10}$ aliphatic diol component is one or more types selected from neopentyl glycol, propylene glycol, and cyclohexane dimethanol.

13. A toner use linear polyester resin (a1) as set forth in any of claims 11 to 12, wherein the dicarboxylic acid component and diol component are esterified in a range of 250 to 280° C. of temperature and in a range of 200 kPa to 500 kPa of pressure, then in a range of 250 to 300° C. and at a temperature 5° C. or more higher than an esterification reaction temperature under 1 kPa or less of pressure for condensation polymerization.

14. A toner containing a toner use linear polyester resin (a1) as set forth in claim 11 as a binding resin.

15. A method of production of a toner linear polyester resin (a1) comprising causing a dicarboxylic acid component and a diol component to react at a temperature of a range of 250 to 280° C. and under a pressure of a range of 200 kPa to 500 kPa by an esterification reaction, then causing condensation polymerization at a temperature in the range of 250 to 300° C. and 5° C. or more higher than the esterification reaction temperature under a pressure of 1 kPa or less.

16. A toner linear polyester resin (b1) comprised of a linear polyester resin comprised of a dicarboxylic acid component and a diol component, comprising an aromatic dicarboxylic acid in a total carboxylic acid component in an amount of 50 mol % or more, containing a $C_4$ to $C_8$ aliphatic diol in an amount of 60 parts by mole or more with respect to 100 parts by mole of the total carboxylic acid component, having a glass transition temperature in a range of 40 to 70° C., having a mass average molecular weight Mw in a range of 4,000 to 10,000, not having a melting point, and having a softening temperature in a range of 90 to 120° C., wherein the $C_4$ to $C_8$ aliphatic diol is neopentyl glycol.

17. A toner linear polyester resin (b1) as set forth in claim 16, wherein the acid value is a range of 0.5 to 30 mgKOH/g.

18. A toner comprising a toner linear polyester resin (b1) as set forth in claim 16 in the toner in an amount of 5 mass % or more.

19. A toner comprising a binding resin and a coloring agent, said toner characterized in that the binding resin is mainly comprised of polyester resin, the polyester resin contains a polyester resin (X) and a polyester resin (Y), a blending ratio of the polyester resin (X) and polyester resin (Y) is 5/95 to 95/5 (weight ratio), the polyester resin (X) is a linear polyester resin with a mass average molecular weight Mw of 25,000 to 100,000 and a softening temperature of 150 to 220° C., the polyester resin (Y) is a linear polyester resin with a mass average molecular weight Mw of 2,000 to 10,000, and a minimum fixing temperature is 130° C. or less and a range of fixing temperature is 40° C. or more.

20. A toner as set forth in claim 19 wherein the polyester resin (Y) contains a polyester resin having a softening temperature of 100° C. or less.

21. A toner as set forth in claim 19 or 20, wherein the polyester resin (Y) contains at least two types of polyester resin and the difference in softening temperature of those two types of polyester resin is 5° C. or more.

22. A binding resin used in the toner set forth in claim 19.

* * * * *